US011803396B2

United States Patent
Singh et al.

(10) Patent No.: US 11,803,396 B2
(45) Date of Patent: Oct. 31, 2023

(54) INTELLIGENT AUTOMATION OF UI INTERACTIONS

(71) Applicant: Accenture Global Solutions Limited, Dublin (IE)

(72) Inventors: Rajpreet Singh, Bangalore (IN); Veena Sudhakar Padiyar, Mumbai (IN); Viresh Veerasangappa Kadi, Bijapur (IN); Mathan Murugasen, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 92 days.

(21) Appl. No.: 17/566,992

(22) Filed: Dec. 31, 2021

(65) Prior Publication Data
US 2023/0214239 A1    Jul. 6, 2023

(51) Int. Cl.
*G06F 9/451* (2018.01)
*G06N 3/02* (2006.01)
(Continued)

(52) U.S. Cl.
CPC ............ *G06F 9/451* (2018.02); *G06F 3/0481* (2013.01); *G06F 3/0485* (2013.01); *G06N 3/02* (2013.01);
(Continued)

(58) Field of Classification Search
None
See application file for complete search history.

(56) References Cited

U.S. PATENT DOCUMENTS 9,424,167 B2  8/2016  Lee et al.
9,465,726 B2  10/2016  Kozhuharov
(Continued)

FOREIGN PATENT DOCUMENTS

CN  111209915 A  5/2020
EP  3030969 B1  2/2019

OTHER PUBLICATIONS

Gumeli, C. et al. "ROCA: Robust CAD Model Retrieval and Alignment From a Single Image," IEEE/CVF Conference on Computer Vision and Pattern Recognition, Jun. 2022, 13 pages.
(Continued)

*Primary Examiner* — Tuan S Nguyen
(74) *Attorney, Agent, or Firm* — Norton Rose Fulbright US LLP

(57) ABSTRACT

Aspects of the present disclosure provide systems, methods, and computer-readable storage media that support creation and execution of automated sequences of user interface (UI) interactions. To facilitate creation and execution of automated sequences of UI interactions, an automation engine is provided and includes a model configured to capture image data when creating the sequence of UI interactions. The model may also be used during replay of the sequence of UI interactions. For example, the model may be used during replay of the sequence of UI interactions to locate UI elements corresponding to the UI interactions, or to perform pre- and/or post-validation of action execution. The automation engine may also provide processes to enable location of dynamic content, such as UI elements that may be presented in different or unexpected locations, and processes to address complex UI elements, such as data grids, tree views, and drawings (e.g., CAD drawings).

20 Claims, 12 Drawing Sheets

(51) Int. Cl.
    *G06V 10/82*     (2022.01)
    *G06V 20/64*     (2022.01)
    *G06F 3/0485*    (2022.01)
    *G06F 3/0481*    (2022.01)
    *G06V 20/50*     (2022.01)

(52) U.S. Cl.
    CPC .............. *G06V 10/82* (2022.01); *G06V 20/50*
        (2022.01); *G06V 20/64* (2022.01)

(56) References Cited

U.S. PATENT DOCUMENTS

| | | | |
|---|---|---|---|
| 9,477,583 B2 | 10/2016 | Maddela | |
| 10,831,634 B1* | 11/2020 | Ritter | G06F 9/451 |
| 11,320,954 B2* | 5/2022 | Kim | G06F 3/0481 |
| 2014/0344683 A1* | 11/2014 | Urunga | G06F 9/453 |
| | | | 715/705 |
| 2015/0339213 A1* | 11/2015 | Lee | G06F 3/0484 |
| | | | 717/125 |
| 2017/0337116 A1* | 11/2017 | Negara | G06F 11/3636 |
| 2020/0310833 A1* | 10/2020 | Hally | G06F 9/451 |

OTHER PUBLICATIONS

European Patent Office, Communication, Extended European Search Report issued for European Patent Application No. 22213306.8, dated May 22, 2023, 11 pages.

\* cited by examiner

INTELLIGENT AUTOMATION OF UI INTERACTIONS

TECHNICAL FIELD

The present disclosure relates generally to automation techniques and more particularly, to techniques for automating sequences of user interface (UI) interactions using intelligent UI traversal, dynamic content detection, and execution validation capabilities.

BACKGROUND

As technology has advanced, so too have the ways in which technology can be leveraged to improve processes. For example, automation has enabled automobile manufacturing processes to be streamlined through the use of robots that are capable of performing certain portions of the manufacturing process (e.g., assembling and connecting parts, etc.). In addition to automation of manufacturing tasks, technology advancements have also enabled other types of automation, such as software development and testing. In such automation techniques pieces of code may be generated for a piece of software or to test a piece of software in an automated fashion, thereby speeding up the process of developing and/or testing software.

While such automation tools and techniques have been utilized to improve various types of processes and systems, there are several areas where automation challenges remain. One such area is automation of processes involving user interfaces (UIs), such as testing of UIs and/or automating interactions with UIs. Optical character recognition (OCR) techniques have been developed for testing UIs, but existing OCR-based UI automation techniques provide limited capabilities and are not suitable for use with complex UIs, such as UIs associated with highly interactive applications or applications involving dynamic content (e.g., data grids with dynamic columns and/or changing data). Such UIs present challenges for automation because they are not predictable in terms of responsiveness, the location of UI elements, utilization of dynamic content, scrolling requirements, or other factors. As a result, it is difficult to implement reliable automation functionality that works all of the time and/or performs automated tasks accurately. The existing OCR-based techniques also require usage and integration of a lot of different tools to achieve largescale and practical testing automation for applications with heterogeneous platforms (e.g., web, smart phone, desktop, etc.).

While other types of automation tools are available, they tend to be purpose built for specific use cases and have very limited capabilities when it comes to automation of UI functionality without requiring manual scripting. Automation libraries like Selenium, WinAppDriver, and Appium cater only to applications where scraping is possible (e.g., the ability to identify the control through XPath/ID etc.). Automation done using these tools will need to be re-done when the target application goes through changes (e.g., due to changes in)(Path, dynamic content, and the like).

As an illustrative example of at least some of the shortcomings of existing solutions described above, to perform automation with respect to a UI, a user is required to manually generate cutouts of the UI and the cutouts may then be used to generate testing scripts or other automated functionality for the UI. For example, the user may first capture a screenshot of the UI. The screenshot may then be displayed on a display device and the user may manually interact with UI elements present in the screenshot. The manual interaction may include using a mouse to move a cursor to an element of the UI that is of interest and then execute an interaction command (e.g., a left click or right click of the mouse, a double click of the mouse, etc.). The interactions between the user and the screenshot may be recorded to capture the screen locations of the cursor and the interaction commands generated by the user. For a multi-step UI interaction sequence multiple screenshots may need to be captured and displayed. To illustrate, a first UI screenshot may be displayed and the user may record an interaction with an element of the first UI screenshot. The recording may be paused and a second UI screenshot may be displayed, the second UI screenshot depicting the UI as it would be presented if the interaction with the element of the first UI screenshot had been performed using the "live" UI (e.g., if the first interaction was to select a dropdown menu, such as the "File" menu common to many applications, the second UI screenshot may display the UI with the "File" menu dropdown displayed). Once the second UI screenshot is displayed, one or more additional interactions may be recorded with elements of the UI displayed in the second UI screenshot. This process may be repeated multiple times to simulate interaction with the "live" UI. The recorded interactions with the UI screenshots may subsequently be replayed with respect to the "live" UI to perform the recorded sequence of interactions in an automated manner.

As can be appreciated from the illustrative example above, the existing techniques present several drawbacks. First, since the process involves interacting with the screenshot, as opposed to the "live" UI, no actions occur as a result of the interaction commands. Thus, the recorded interactions do not provide information that may be used to validate the command was executed during replay. Second, because the screenshot may be generated at a specific resolution, replaying the recorded interactions on the "live" UI may result in errors if the resolution of the "live" UI is different than that of the UI screenshots. For example, the recorded interactions may indicate a particular location on the screen, such as an (x, y) coordinate where a click of the mouse is to be performed. If the resolution of the "live" UI is different from that of the UI screenshots from which the recordings were made, the particular locations specified in the recorded interactions may not correspond to the same UI elements and may introduce errors in the sequence resulting from the replay. Similar problems may also occur for UIs where dynamic content is displayed or where other types of interactions occur (e.g., scrolling, selecting cells of a data grid, navigating an expandable and collapsible menu).

Additionally, implementing test cases for a UI, whether based on the recorded interactions or other techniques, may require scripting knowledge, which can require a lot of effort to update over time as changes to the UI and/or the test cases occur. Manually drafting such test automation scripts also requires a lot of additional implementation to handle realistic situations, such as environment specific issues (e.g., system slowness or screen response delays caused by network bandwidth, etc.). It can be appreciated from the foregoing that existing processes for performing various aspects of UI automation are time consuming, require specialized programming knowledge, and may be error prone. It is noted that the various non-limiting examples described above are intended to highlight just some of the drawbacks that exist with currently available UI automation technologies, but other drawbacks may also occur depending on the particular UI involved, the types of automation being performed, and/or the use cases tested. For example, existing UI automation techniques are not suitable for certain types of UIs, such as engineering applications (e.g., AutoCAD drawings, etc.).

SUMMARY

Aspects of the present disclosure provide systems, methods, and computer-readable storage media that support creation and execution of automated sequences of user interface (UI) interactions. To facilitate creation and execution of automated sequences of UI interactions, an automation engine is provided. The automation engine includes a model configured to capture image data during creation of and execution of sequences of UI interactions. In addition to capturing image data, the automation engine may provide functionality for extracting additional information during creation of automated UI sequences, such as OCR functionality for extracting text from a UI. The automation engine may also include functionality for determining location information for UI elements, calculating spatial relationships between UI elements (e.g., offsets, heights, central points, etc.), determining action types, generating validation data, or other types of functionality.

During replay of a sequence of UI interactions generated in accordance with the concepts disclosed herein, the machine learning model of the automation engine may be utilized to locate UI elements. As noted above, in some UIs the UI elements may be displayed in different locations (e.g., due to dynamic content, different resolutions of a display space in which the UIs are presented, or other factors). The automation engine may provide functionality for visually searching UIs for UI elements of interest such that the UI elements may be located despite not appearing in an expected location.

Additionally, the automation engine provides functionality for traversing tree views to identify elements of the tree view for which actions are to be executed. As will become apparent from the detailed description below, the tree view traversal functionality of the automation engine provides a robust way to automate UI interactions involving tree views. For example, the automation engine may receive information associated with the action to be performed and the tree view element the action is to be performed at. Using this information, the automation engine may intelligently search through the tree view to locate the tree view element and then execute the action. In traversing the tree view, the automation engine may expand levels of the tree view, search the newly expanded levels, and then continue with the next level. If needed, the automation engine also provides functionality that enables scrolling of the tree view and dynamically generated mapping data may enable a waypoint to be created that may serve as a point from which traversing the tree view may resume after the scrolling. The automation engine provides similar capabilities with respect to analyzing data grids. Furthermore, by leveraging the machine learning model and its computer vision capabilities, the automation engine also enables sequences of automated UI interactions to be created and executed on UIs that were previously not capable of automation, such as UIs for drawings applications (e.g., AutoCAD, Photoshop, or other drawing applications).

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Aspects of the present disclosure provide systems, methods, apparatus, and computer-readable storage media that support creation and execution of automated sequences of user interface (UI) interactions. To facilitate creation and execution of automated sequences of UI interactions, an automation engine is provided and includes a model configured to capture image data when creating the sequence of UI interactions. The model may also be used during replay of the sequence of UI interactions. For example, the model may be used during replay of the sequence of UI interactions to locate UI elements corresponding to the UI interactions, or to perform pre- and/or post-validation of action execution. The automation engine may also provide processes to enable location of dynamic content, such as UI elements that may be presented in different or unexpected locations, and processes to address complex UI elements, such as data grids, tree views, and drawings (e.g., CAD drawings).

Figure 1:
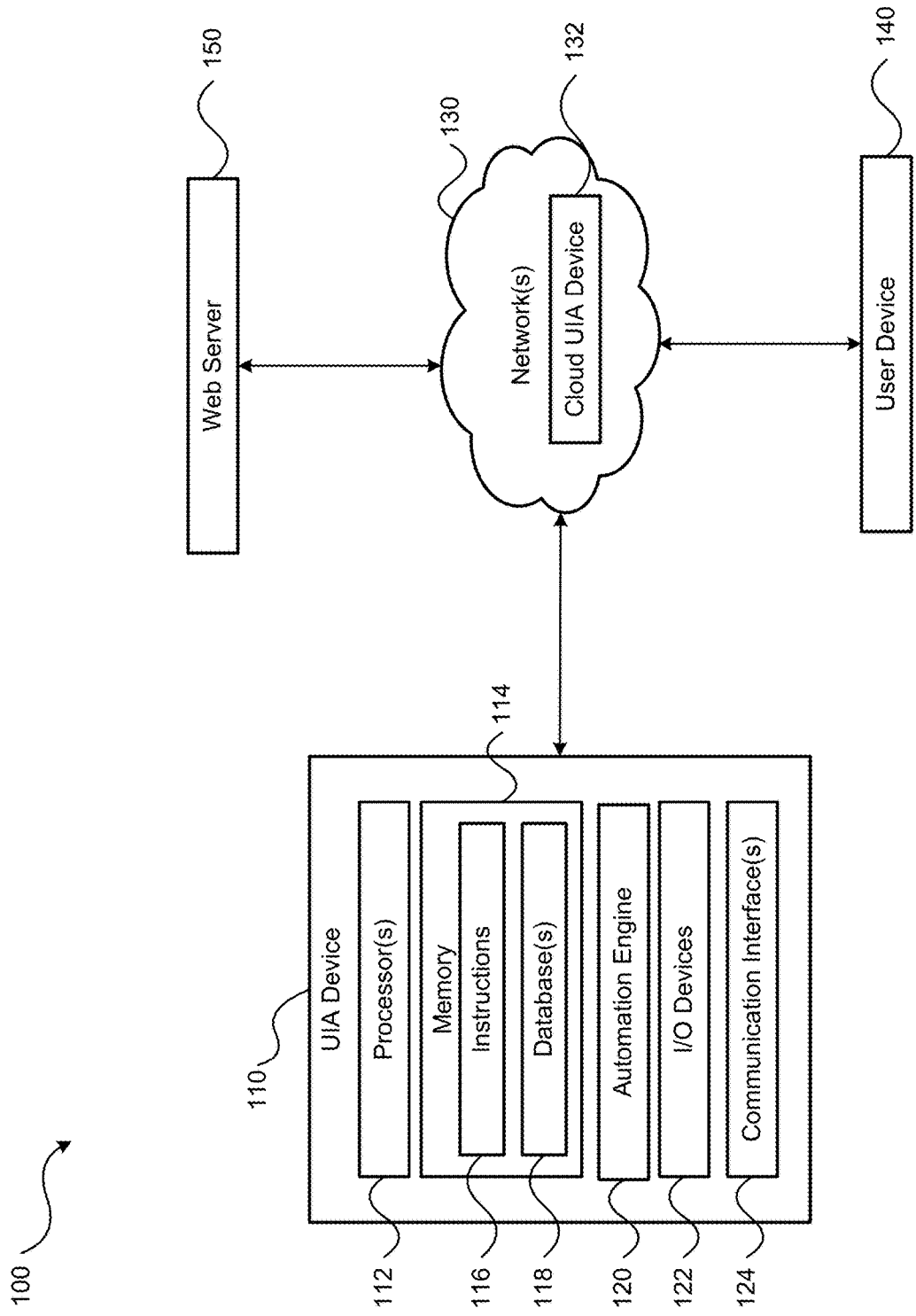
FIG. 1 is a block diagram of an example of a system that supports automation of UI tasks according to one or more aspects of the present disclosure.

Referring to FIG. 1, an example of a system that supports automation of UI tasks according to one or more aspects of the present disclosure s is shown as a system 100. The system 100 may be configured to obtain information associated with a UI and leverage the obtained UI information to automate various tasks (e.g., tasks testing of the UI, tasks for automating interaction with the UI, etc.). As explained in more detail below, the UI automation techniques and functionality provided by the system 100 overcome problems associated with existing UI automation techniques. For example, the system 100 may enable automation of UIs having dynamic content and may dynamically respond to UI changes without requiring manual scripting. It is noted that these are just some of the advantages provided by the system 100 and additional advantages are described below and apparent from the present disclosure as a whole.

As shown in FIG. 1, the system 100 includes a user interface automation (UIA) device 110. The UIA device 110 may include or correspond to a desktop computing device, a laptop computing device, a personal computing device, a tablet computing device, a mobile device (e.g., a smart phone, a tablet, a personal digital assistant (PDA), a wearable device, and the like), a server, a virtual reality (VR) device, an augmented reality (AR) device, an extended reality (XR) device, a vehicle (or a component thereof), an entertainment system, other computing devices, or a combination thereof, as non-limiting examples. The UIA device 110 includes one or more processors 112, a memory 114, an automation engine 120, one or more input/output (I/O) devices 122, and one or more communication interfaces 124. In some other implementations, one or more of the components 112-124 may be optional, one or more additional components may be included in the UIA device 110, or both. It is noted that functionalities described with reference to the UIA device 110 are provided for purposes of illustration, rather than by way of limitation and that the exemplary functionalities described herein may be provided via other types of computing resource deployments. For example, in some implementations, computing resources and functionality described in connection with the UIA device 110 may be provided in a distributed system using multiple servers or other computing devices, or in a cloud-based system using computing resources and functionality provided by a cloud-based environment that is accessible over a network, such as one or more networks 130. To illustrate, one or more operations described herein with reference to the UIA device 110 may be performed by one or more servers or a cloud-based UIA device 132 that communicates with one or more client or user devices and/or external systems.

The one or more processors 112 may include one or more microcontrollers, application specific integrated circuits (ASICs), field programmable gate arrays (FPGAs), central processing units (CPUs) having one or more processing cores, or other circuitry and logic configured to facilitate the operations of the UIA device 110 in accordance with aspects of the present disclosure. The memory 114 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the UIA device 110 may be stored in the memory 114 as instructions 116 that, when executed by the one or more processors 112, cause the one or more processors 112 to perform the operations described herein with respect to the UIA device 110, as described in more detail below. Additionally, the memory 114 may be configured to store data and information, such as information associated with one or more UIs, in one or more databases 118. Illustrative aspects of the one or more databases 118 are described in more detail below.

The one or more input/output (I/O) devices 122 may include one or more display devices, a keyboard, a stylus, one or more touchscreens, a mouse, a trackpad, a microphone, a camera, one or more speakers, haptic feedback devices, or other types of devices that enable a user to receive information from or provide information to the UIA device 110. In some implementations, the UIA device 110 is coupled to the display device, such as a monitor, a display (e.g., a liquid crystal display (LCD) or the like), a touch screen, a projector, a virtual reality (VR) display, an augmented reality (AR) display, an extended reality (XR) display, or the like. In some other implementations, the display device is included in or integrated in the testing device 110. The one or more communication interfaces 124 may be configured to communicatively couple the testing device 110 to the one or more networks 130 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, and the like).

The automation engine 120 of the UIA device 110 may be configured to provide functionality for automating various processes involving interactions with UIs, such as automating sequences of actions, automating all or portions of a UI testing process, or other types of use cases and processes involving UI-automation. To automate functionality of a UI, the automation engine 120 may be configured to capture information associated with the UI. For example, a user may launch an application associated with the UI. Once launched, the UI may be displayed and a user may perform one or more actions to interact with the UI, such as to click on interactive elements of the UI (e.g., buttons, menus, etc.), input data into one or more data fields of the UI (e.g., data fields of a form, cells of a data grid, etc.), or other types of actions. As the user performed these actions information may be captured by the automation engine 120. The captured information may include location data, action data, image data, validation data, or other types of information (e.g., font colors, etc.) displayed within the UI of the application.

The captured location data may include information defining a location within a coordinate system where the user activated one or more of the interactive elements. The coordinate system may be a 2D plane representing the area of the UI, as displayed during the user interaction. In this manner, the displayed UI may be divided into a grid and locations of actions performed by the user when interacting with the UI may be obtained. However, as noted above, the UI may be displayed at different resolutions and utilizing coordinates alone may be insufficient to recreate the user's actions (e.g., if the user clicked on the edge of a button, the location of the edge may change when the UI is displayed at a different resolution, resulting in the replayed click not interacting with the target button). The automation engine 120 may provide validation functionality to address such problems, as described in more detail below.

The action data may include information associated with interactions between the user and the UI. For example, the user may utilize a mouse to perform a click (e.g., a left click, a right click, a double left click), a scroll operation (e.g., to scrolling the UI in a particular direction, such as up, down, left, or right), a drag operation (e.g., a click and hold of a mouse button in combination with movement of the mouse cursor from one location within the UI to another location), a data entry operation (e.g., to input alpha-numeric characters into a data field or cell of a data grid displayed within the UI), a data extraction operation (e.g., selection of text or other elements of the UI followed by a copy command, such as control+c or via a right click of the mouse and navigation of the mouse menu to the "copy" command), an item selection command (e.g., selecting a portion of a 2D or 3D drawing within an engineering design application, selecting a radio button, selecting an expand or collapse control of a tree view), or other types of actions.

The image data captured by the automation engine 120 may include the elements of the UI that the user interacted with as the various actions were performed. For example, when the user clicks a button, an image associated with a region surrounding the coordinates of the click may be captured, thereby capturing an image of the button (or other type of interactive element) associated with the action. The image may then be analyzed using the machine learning model to classify the interactive element(s) associated with each action performed by the user. In some aspects, image processing may be used to identify the interactive element, such as to utilize contrast information to identify the borders of the interactive element. The image data may also include other types of content displayed within the UI, such as image data depicting at least a portion of a 3-dimensional (3D) or 2-dimensional (2D) drawing created using an engineering design application (e.g., AutoCAD, Solidworks, etc.) or other types of drawing and design application (e.g., Photoshop). Image data captured from the engineering design application may then be incorporated into the machine learning model to enable subsequent interaction with drawings in an automated fashion. Extraction and use of image data extracted from engineering design applications in accordance with the concepts disclosed herein is described in more detail below with reference to FIG. 7.

The captured validation data may include data that may reflect a state of the UI before a UI interaction (e.g., pre-validation data), such as the presence of a UI element associated with the UI interaction, and data reflecting a state of the UI after the UI interaction (e.g., post-validation data), such as data reflecting changes to the UI in response to the UI interaction. For example, the content displayed within the UI may change when the user clicks on an interactive element, such as displaying a dropdown menu, expanding a tree view, closing a pop-up window, or other changes. The validation data associated with the state of the UI may subsequently be utilized to validate execution of automated actions, such as verifying an expected UI state before an action is performed or an expected UI state change occurred after the action is executed. In this manner, the validation data may enable the automation engine 120 to account for various performance issues that may occur during execution of an automated task or sequence of tasks involving a UI. For example, application performance may be impacted by various factors, such as available memory, processor bandwidth, network bandwidth (e.g., for network-based applications, cloud-based applications, browser-based applications, and the like), the level of optimization of the application and/or UI, complexity of computations performed by the UI, and the like, and these performance factors may impact automation of UI tasks. For example, display latency may result in a UI element not being presented at the time an action is performed, which may prevent execution the action associated with the UI element. This type of error, or other performance related errors, can cause presently available UI automation techniques to fail since those techniques do not include capabilities to validate aspects of the UI during execution of automated actions. However, using the validation data captured as described above, the automation engine 120 may perform pre- and post-validation, thereby overcoming problems that may arise due to various types of performance factors. Additional aspects of performing validation of automated UI tasks in accordance with the present disclosure are described in more detail below.

As briefly described above, the automation engine 120 may include a machine learning model that facilitates identification and classification of UI elements involved in a sequence of automated tasks. In an aspect, the model may be a region-based convolutional neural network (RCNN) model. The RCNN model may scan the image of the UI to identify a region of interest. In an aspect, the region of interest may be identified by locating the cursor of a mouse. To illustrate, during recording of the sequence of tasks the user may place a cursor over a UI element and hover over the element for a period of time (e.g., 0.5 seconds (s), 1 s, 3 s, 3-5 s, or another period of time). During the hovering period, the RCNN model may analyze image data representing the displayed UI to identify a region of the UI corresponding to the UI element over which the cursor is hovering. Once identified, the RCNN model may determine a box or other type of boundary surrounding the region, where the region corresponds to the UI element of interest. The RCNN model may be trained to identify or classify various UI elements (e.g., buttons, data fields, interactive menus, icons, tree views, and the like) based on image data captured by the automation engine 120 during the hovering period. After the hovering period, the user may execute the action and additional data may be recorded, such as the type of action (e.g., a click action, a data input action, scroll action, etc.), location information associated with the region of interest and action, pre-and-post validation data, and the like, as described above. A sequence of UI interactions may be performed using the above-described techniques and the RCNN model. The information recorded as the series of actions is performed may be subsequently replayed, thereby enabling the sequence of UI interactions to be performed in an automated manner. Additional exemplary details regarding performance of UI interactions in accordance with aspects of the present disclosure and advantages that may be realized through such automation techniques are described in more detail below.

As shown in FIG. 1, the system 100 may also include a user device 140. The user device 140 may be a computing device, such as a laptop computing device, a desktop computing device, a tablet communication device, or other type of device capable of being utilized for interacting with UIs in accordance with the techniques disclosed herein. The user device 140 may include components similar to those described above with reference to the UIA device 110, such as processors, memory, I/O devices, communication interfaces, and the like. In some aspects, the functionality described herein with reference to the UIA device 110 may be incorporated into the user device 140 (e.g., as instructions stored in the memory of the user device 140) to enable a user to create automated UI sequences. The automated UI sequences created by the user may be utilized to perform testing on UIs. For example, the user of the user device 140 may be a UI designer and may utilize the user device 140 to create and test UIs (e.g., prior to distribution of an application associated with the UI to the public or other users).

In some aspects, the testing of UIs using the automated sequences of UI interactions may be performed across multiple different user devices 140 (e.g., desktop and laptop computing device, tablet computing devices, smartphones, etc.), which may enable testing of the UI functionality at different resolutions and hardware configurations. Such testing may enable UIs to be tested in a robust manner that may enable detection of inefficiencies in the UI design for which further optimization may be needed. As a non-limiting example, the processing capabilities of certain types of user devices (e.g., desktop and laptop computing devices) may be greater than other types of user devices (e.g., smartphones, tablet computing devices, etc.) and the ability to perform testing across a diverse number of user devices types may reveal that performance of the sequence of UI interactions is degraded for certain user devices as compared to others. This may enable the user to identify where further optimization of the UI may be needed. Additionally, the ability to perform testing across multiple different devices types using the concepts disclosed herein may enable testing of the UI using a single automated testing sequence (e.g., a recorded sequence of UI interactions as described above) despite differences that may exist between the UI across different device types (e.g., the UI as presented on a mobile device, such as a smartphone, may be visually different than the UI presented on a desktop or laptop computing device due to the limited size of mobile device screens as compared to displays of desktop and laptop computing devices). In particular, the UI automation functionality provided by aspects of the present disclosure provides intelligent processing capabilities (e.g., the RCNN model or other capabilities) to locate UI elements despite such elements appearing in different locations, as described in more detail below. This may eliminate the need to create multiple testing sequences (e.g., different sequences for different types of devices, different presentations of the UI elements on different devices, etc.), as may be required by prior UI automation techniques that do not possess the ability to dynamically locate UI elements. It is noted that in some aspects, rather than physically performing the testing of UIs on different types of user devices, one or more emulators may be provided by the user device 140 (or the UIA device 110), where the emulators are configured to emulate interaction with the UI on different types of devices, thereby enabling a single user device 140 to create, execute, and test automated UI interaction sequences across different types of devices.

In some aspects, creation, execution, and or testing of automated UI interaction sequences may be facilitated using the UIA device 110 and the user device 140. For example, the application associated with the UI may be executed on the user device 140 and information displayed at a display device associated with the user device 140 may be shared with the UIA device 110 to provide information to the RCNN model or other UI automation functionality. Furthermore, it is noted that in some aspects, the functionality described herein with reference to the UIA device 110 may be provided in a cloud-based deployment, shown in FIG. 1 as cloud-based UIA device 132. In such an arrangement, the user device 140 may communicate with the cloud-based UIA device 132 that provides functionality described herein for creating automated sequences of UI interactions. It is noted that once an automated sequence of UI interactions is created, whether via functionality of the UIA device 110, the cloud-based UIA device 132, or functionality of the user device 140, execution of the automated sequence of UI interactions may be performed on the same or a different device than the device used to create the sequences. To illustrate, automated sequences of UI interactions created using the UIA device 110 may be executed (e.g., for UI testing purposes or to simply automate a sequence of actions involving a UI) at the UIA device 110, at the cloud-based UIA device 132, or at the user device 140. Execution of the automated sequence of UI interactions at different devices may be particularly beneficial for UIs involving network-enabled applications, such as UIs associated with applications supported by a web server 150 or cloud services/infrastructure, that leverage data stored on a network or applications accessed through a web browser (e.g., since network latencies may impact performance and present of the UI and its supporting functionality). To illustrate, execution of automated sequences of UI interactions using the UIA device 110 or the cloud-based UIA device 132 may not be representative of the performance that would be experienced when executing the sequences on the user device 140 because the UIA devices 110, 132 may have more computing resources, a higher bandwidth network connection, etc. However, in some implementations, the UIA devices 110, 132 may utilize computing resources comparable to one or more types of user devices 140 and in such instances execution of the automated sequences of UI interactions at the UIA devices 110, 132 may be representative of the performance of the UI interactions at the user devices 140.

As shown above, the system 100 and the functionality provided by the UIA device 110 may enable automated sequences of UI interactions to be generated in a more robust manner as compared to prior techniques. In particular, unlike prior techniques that relied on manually created images and OCR-based techniques, the automation engine 120 may dynamically capture information associated with a sequence of UI interactions as the user interacts with the UI. The dynamically captured information may include image data (e.g., images associated with regions where the UI interactions take place), validation data (e.g., UI state data that may indicate availability of UI elements associated with the UI interactions or to validate UI interactions are executed), or other types of information (e.g., location information), as described above. The image data may be provided to a model (e.g., an RCNN model) configured to classify the UI element(s) of the image, where the classification may indicate a type of UI element depicted in the image (e.g., a button, a data field, a dropdown menu, a tree view, etc.).

The automation engine 120 may also provide functionality configured to automatically execute the captured sequence of UI interactions and to address various issues that may arise during replay of the recorded UI interactions. For example, a UI element may be expected in a first location of the UI (e.g., based on the recorded location data) but may be presented in a different location during the replay (e.g., due to dynamic content capabilities of the UI, different display resolutions, etc.). The replay functionality provided by the automation engine 120 may be configured to search the UI and locate the UI element, thereby enabling the execution of the action despite the UI element being in a different location than expected based on the recorded data. Additionally, the replay functionality provided by the automation engine 120 may be configured to identify appropriate UI elements in tree views and data grids. Furthermore, the replay functionality may utilize the validation data to perform pre-validation and post-validation operations to address performance issues that would otherwise cause prior replay techniques to fail. For example, prior to executing an action the automation engine 120 may perform pre-validation to verify that the UI element is present. If present, the action may be executed and the automation engine 120 may then perform post validation to confirm that the action was executed prior to advancing to the next UI interaction in the sequence. Leveraging the various replay functionalities described above enables the system 100 to overcome many of the drawbacks of prior techniques utilized to automate UI interactions. For example, previous techniques may fail if the UI elements are in unexpected locations or because of performance issues encountered during playback (e.g., a click action may be executed before the UI element is presented due to display latency or because the prior action is still being processed). Accordingly, it is to be appreciated that the functionality provided by the UIA device 110, the cloud-based UIA device 132, or UIA device functionality executing on another device (e.g., the user device 140) improves upon prior UI interaction automation techniques and enables new types of UI interactions to be performed in an automated manner (e.g., interactions involving tree views and dynamic content). Additional details regarding the replay functionality provided by the automation engine 120 are described in more details below.

Figure 2A:
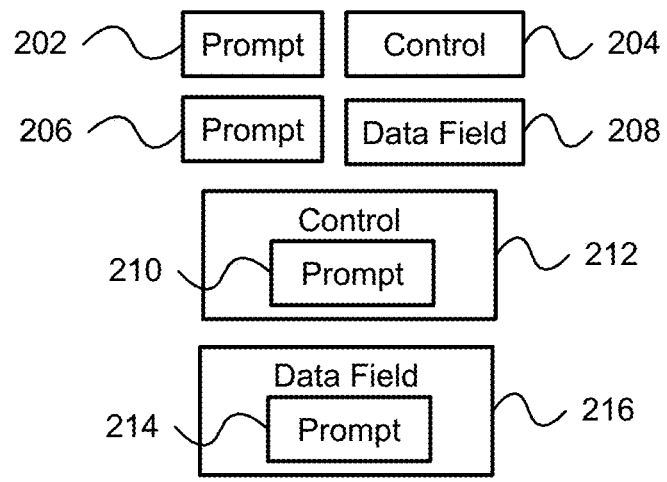
FIG. 2A is a block diagram illustrating exemplary UI elements for automating UI tasks according to one or more aspects of the present disclosure.
Figure 2B:
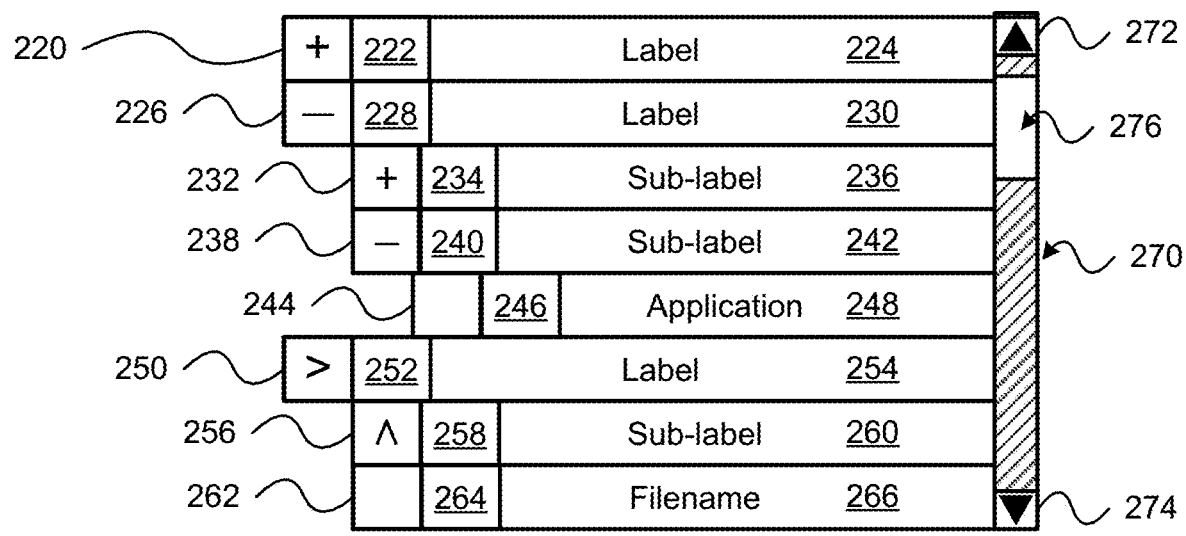
FIG. 2B is a block diagram illustrating additional exemplary UI elements for automating UI tasks according to one or more aspects of the present disclosure.

Referring to FIGS. 2A and 2B, block diagrams illustrating exemplary UI elements for automating UI tasks according to one or more aspects of the present disclosure are shown. As shown in FIG. 2A, UI elements for which UI interactions may be automated may include a prompt 202, control 204, a prompt 206, a data field 208, a prompt 210, and a control 212. Control 204 may be a clickable button, a radio icon, a dropdown menu, a tab (e.g., some applications, such as spreadsheet applications and web browsers, enable multiple display windows to be created and each may be selected for display via tabs corresponding to each window), check boxes, or other types of interactive elements. In the context of FIG. 2A, the prompt 202 may be associated with control 204 and may present information to the user to convey information associated with control 204 (e.g., control 204 may be a radio button and prompt 204 may present information to the user that indicates whether the user should click control 204 or not). Data field 208 may correspond to a data field displayed in an application for capturing information from a user, such as allowing the user to type alphanumeric characters into the data field 208. As with prompt 202 and control 204, the prompt 206 may convey information to the user regarding the types of information to be provided to the data field 208 (e.g., username, password, first name, last name, or other types of information for which the application is configured to capture from the user). It is noted that other types of prompt/control pairs may also be utilized in some UIs and applications. For example, as shown in FIG. 2A, control 212 may be displayed as an icon, such as a button, and the prompt 212 may be displayed within the boundaries of the control 212. Similarly, the data field 216 may include the prompt 214 as text presented within the data field, which may be automatically removed once the data field 216 is activated (e.g., once the user clicks on the data field).

As described above with reference to FIG. 1, an automation engine in accordance with the present disclosure may utilize the various characteristics of the above-described UI elements to classify the elements. For example, during a recording phase the user may hover a cursor of a mouse over a control for a hover period. During the hover period, the automation engine may scan the UI and detect that the user is hovering over the control and capture image data associated with a region that surrounds control. Since the image data captured during the hover period may be processed (e.g., using the above-described RCNN model or another computer vision model) and utilized to subsequently replay the sequence of actions, the automation engine may determine whether additional data is needed to classify the control. For example, if the control the user is hovering over is the control 210 having prompt 212, an image capturing the control 210 may provide sufficient information to subsequently locate the control 212 (e.g., during replay). In contrast, where the control the user is hovering over is the control 204, only capturing image data associated with the control 204 may be insufficient to subsequently locate the control 204 during replay (e.g., because there may be multiple similar controls and prompts within the UI). If the control 204 is detected, additional image data may be captured to provide enough information to subsequently identify control 204 during replay, such as to capture image data associated with the prompt 202. Data fields may be handled in a similar fashion. For example, while the data field 216 may include the prompt 214 (e.g., prompt text presented within the data field that may be deleted or hidden when the user clicks on the data field 216), the data field 208 is associated with prompt 206. Image data associated with data field 208 may be insufficient for identifying a particular data field among a plurality of data fields presented within a UI (e.g., a form) and so image data expansion may be performed to associated the prompt 206 with the data field 208. In contrast, image data associated with the data field 216 may include the prompt 214 and image data expansion may not be required. It is noted that in some aspects image data expansion may not be performed and location-based identification of data fields may be utilized.

In FIG. 2B another type of UI element for which automation of UI interactions is enabled by UIA devices of the present disclosure is shown. In particular, FIG. 2B shows a tree view UI element, which presents a hierarchical menu of expandable and collapsible elements. In the exemplary depiction of FIG. 2B, each of the elements of the tree view includes an action indicator, an icon, and a target. For example, the tree view includes action indicators 220, 226, 232, 238, 244, 250, 256, 262; icons 222, 228, 234, 240, 246, 252, 258, 264; and targets 224, 230, 236, 242, 248, 254, 260, 266. The visual items to indicate whether a particular portion of the tree view is expandable or not. For example, action indicator 220 (e.g., "+") may indicate that the action indicator 220 may be activated, such as by clicking on the action indicator 220, to expand the tree view. For example, the action indicator 226 has been activated to display additional portions of the tree view (e.g., the action indicator 232 and its associated icon 234 and target 236, and the action indicator 238 and its associated target 242) and the action indicator 238 has been activated to show another portion of the tree view (e.g., the action indicator 244 and its associated icon 246 and target 248). It is noted that the action indicators may change based on each activation. For example, the action indicator 220, shown in FIG. 2B as "+", may be activated to expand a corresponding portion of the tree view, and upon activation of the action indicator 220, the "+" may change to a "−", as shown by activated action indicator 226. Thus, it should be understood that in FIG. 2B, action indicators 220, 232, 250, and 256 may be activated to expand the tree view (e.g., show additional portions of the tree view), and action indicators 226, 238 may be activated to collapse the tree view (e.g., hide the portions of the tree view shown upon activation). It is noted that different types of tree views may utilize different symbols or graphics to indicate expansion and collapse actions (e.g., "+" and "−" as in action indicators 220, 226, 234, 240; or ">" and "v" as in action indicators 250, 256).

Furthermore, some of the action indicators may not include an icon or other graphic, such as action indicators 244, 262, which may indicate that those action indicators are not actionable (i.e., clicking on the action indicators 244, 262 may not cause expand or collapse the tree view). Despite action indicators 244, 262 not being actionable, their associated targets (e.g., targets 248, 266) may be actionable. For example, activation of (e.g., clicking on) the target 248 may launch an application and activation of target 266 may open a folder or other action. Using the techniques described above, image and other types of data (e.g., validation data, location data, etc.) may be captured as the user traverses the tree view. As will be described in more detail below, the captured data may be utilized to subsequently traverse the tree view during automatic execution of a sequence of UI interactions that involve tree view UI elements. It is noted that while certain elements of the tree view have been described as using symbols to indicate UI elements for which actions may be performed, in some aspects other types of information may be used to indicate actionable tree view elements, such as text. It is noted that while FIGS. 2A and 2B illustrate certain UI elements that may be involved in automated sequences of UI interactions in accordance with aspects of the present disclosure, it should be understood that the specific UI elements described and illustrated with reference to FIGS. 2A and 2B have been provided for purposes of illustration, rather than by way of limitation and that UI interaction automation techniques in accordance with the present disclosure may readily be applied to sequences of UI interactions involving UI elements other than those explicitly discussed with reference to FIGS. 2A and 2B.

Figure 3A:
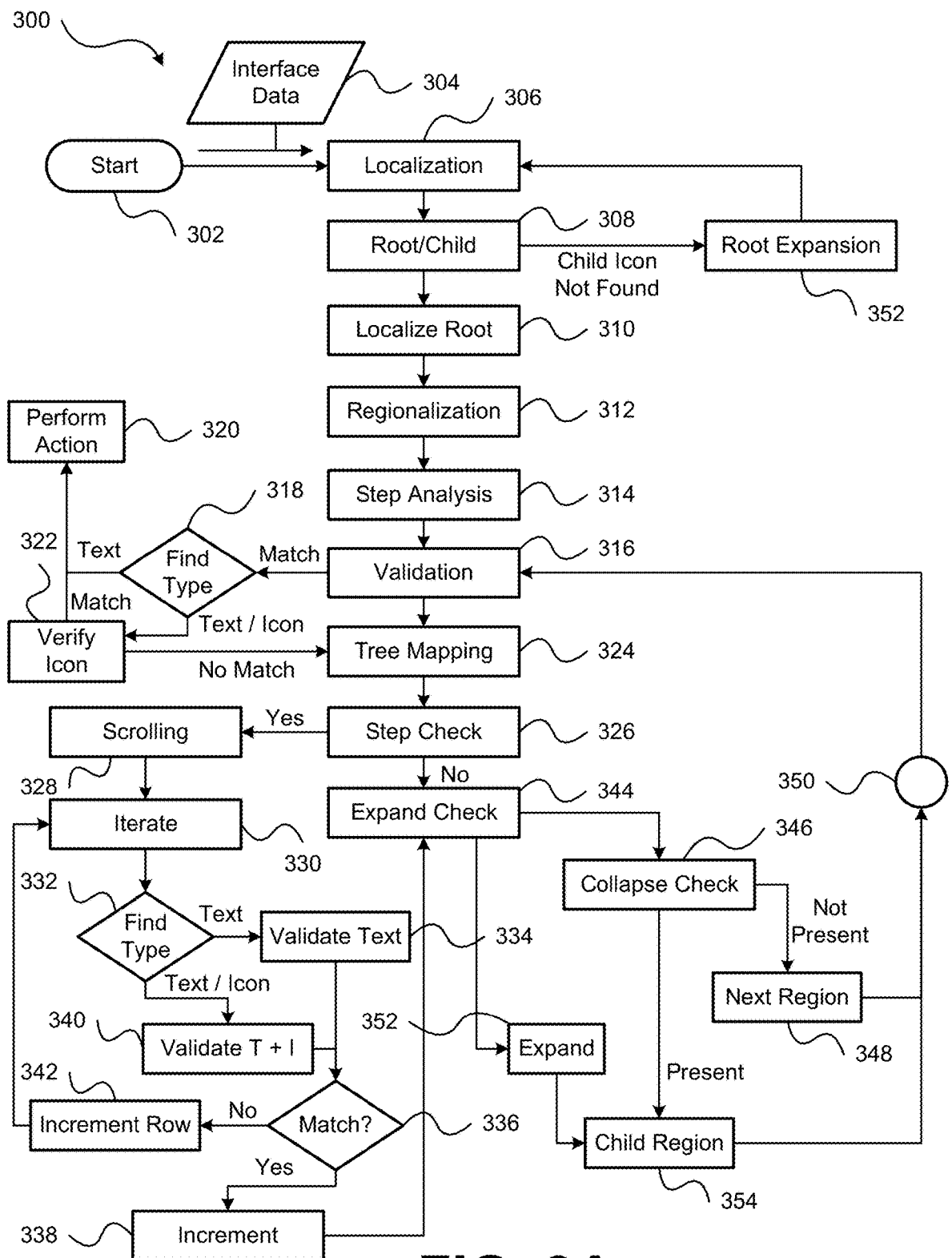
FIG. 3A is a flow diagram illustrating an exemplary process for automation of UI according to one or more aspects of the present disclosure.

Referring to FIG. 3A, a flow diagram illustrating an exemplary process for automation of UI according to one or more aspects of the present disclosure is shown as a process 300. More particularly, the process 300 illustrates techniques for automating UI interactions involving a tree view according to aspects of the present disclosure. The process 300 may begin at block 302, where input data 304 is received. The input data 304 may include information associated with area of the tree view of interest. For example, the input data 304 may be generated using the capture techniques described above with reference to FIG. 1 and may include location data, identification data, an action type, and action data. The location data may include coordinate information associated with the tree view, which may be expressed as Tx, Ty, Tw, Th, where Tw, Ty represent (x, y) coordinates associated with a portion of the tree view (e.g., a top left corner of the tree view), and Tw, Th represent the width and height (e.g., in pixels or another metric) of the tree view). The identification data may indicate a type of information that may be used to identify the portion of the tree view of interest, such as one of the action indicators of FIG. 2B or an actionable target of the tree view (e.g., targets 248, 266 of FIG. 2B). For example, the identification data may indicate whether portion of the tree view of interest can be identified based on text (e.g., targets 248, 266 of FIG. 2B) or whether the portion of the tree view of interest should be identified based on text and an icon (e.g., one of the action indicators of FIG. 2B). Utilizing text and icons may be particular useful for analysis of tree views as compared to text only. For example, if the tree view of FIG. 2B represented a file folder hierarchy of a filesystem, icons 234, 240 may be the same (e.g., a folder icon) and action indicators 232 and 238 may be the same (e.g., both may be a "+" symbol prior to expansion). Therefore, utilizing the text of the targets 236, 242 (e.g., folder names) may enable distinguishing between these two levels or rows of the tree view. In other situations, text-only analysis may be suitable, such as distinguishing between target 248 (e.g., the name of an application) and target 266 (e.g., the name of a file). The action type data may indicate a type of action, such as a click, inputting data to a data field, etc., and the action data may include information that may be used to identify the area of the tree view that is of interest (e.g., the text and/or icon upon which the action should be executed). As shown below, using the process 300, a sequence of UI interactions involving activation of the area of the tree view of interest may be located and perform the action (e.g., click on the area of the tree view).

As shown in FIG. 3A, the input data 302 may be provided to localization logic 306. The localization logic 306 scan (e.g., using the RCNN model of the automation engine 120 of FIG. 1) the tree view displayed within the UI to determine whether the area of interest is displayed. In some aspects, the scanning may only be performed for a portion of the displayed portion of the tree view (e.g., 10%, 20%, 30%, etc.). Once the initial scanning is performed, processing may proceed to root and child logic 308. Root and child logic 308 may be configured to leverage the model to classify the scanned portion of the model to identify the root and first child of the tree view. For example, in the tree view of FIG. 2B, the root may be the portion of the tree view associated with action indicator 220 and the first child may be the first child level shown when the tree view is expanded in respond to activation of the action indicator 220. If the first child is not found, process 300 may proceed to root expansion logic 352, where the model may identify an expansion icon for the root and activate the expansion icon (e.g., activate the action indicator 220 of FIG. 2B).

After expansion of the root by the root expansion logic 352, process 300 may return to localization logic 306, where the tree view (or portion thereof) may be scanned. During this second scan additional elements of the tree view may be identified based on expansion of the root by root expansion logic 352. Once scanning is complete, processing proceeds back to child and root logic 308, where this time a first child may be identified (e.g., based on classifications provided by the RCNN model). Based on the identification of the root and first child by the root and child logic 308, process 300 may proceed to root localization logic 210, which may be configured to determine location data for the root and first child. In an aspect, the location data may be determined for the root as Rx, Ry, Rw, Rh, where Rx, Ry represent (x, y) coordinates associated with the root (e.g., Rx may represent the horizontal location of an icon or other feature of the root and Ry may represent the vertical location of the icon or other feature of the root) and Rw, Rh represent the width and height (e.g., in pixels or another metric) of the root level (or row) of the tree view, and for the first child (FC) as FCx, FCy, FCw, FCh, where FCx, FCy represent (x, y) coordinates associated with the first child (e.g., FCx may represent the horizontal location of an icon or other feature of the first child and FCy may represent the vertical location of the icon or other feature of the root) and FCw, FCh represent the width and height (e.g., in pixels or another metric) of the first child's level (or row) of the tree view.

Once localization of the root and first child is complete, processing may proceed to regionalization logic 312. Regionalization logic 312 may be configured to calculate a region of the first child. In an aspect, the region may be calculated as an area defined as CurrentX, CurrentY, CurrentW, CurrentH, where CurrentX=FCx+FCw, CurrentY=FCy, CurrentW=Tw−FCx+FCw, and CurrentH=FCh, and Tw represents the total width of the tree view. Once the region of the first child is initialized as a current location within the tree view (i.e., a current row of the tree view under consideration), processing may proceed to step analysis logic 314, which may be configured to determine a step size for of the tree view. The step size may be determined as StepX and StepY, where StepX=FCx−Rx and StepY=FCy−Ry. The step size may represent a difference of location between different levels or rows of the tree view, thereby enabling traversal of the tree view by starting from the current region of consideration and incrementing by the step size to locate the next region (i.e., the next row or level of the tree view).

For example, in the exemplary tree view shown in FIG. 2B, the different levels of the tree view may be indented based on root/child relationships (e.g., expandable/collapsible levels and the levels shown in response to expansion). To illustrate, the levels associated with action indicators 220, 226, 250 may all be of the same of a same level type (e.g., top level expandable tree view elements) and may therefore have a same "x" value but different "y" values representing the different vertical positions of those levels. The levels associated with the action indicators 232, 238 are child levels of the tree view with respect to the level associated with the action indicator 226. Unlike the levels associated with action indicators 220, 226, which had an offset that varied only in the "y" direction, the child levels associated with the action indicators 232, 238 may be offset in both the "x" and "y" directions, with the "y" offset being the same or approximately the same as the difference between the "y" offset between the levels associated with action indicators 220, 226. Calculating the StepX and StepY for different levels may enable traversal and interaction with different levels of the tree view despite the locations of actionable portions of the tree view levels (e.g., the action indicators, icons, targets, etc.) being located in different regions for different level types of the tree view, root/top levels (e.g., the levels associated with action indicators 220, 226, 250), child levels (e.g., the levels associated with action indicators 232, 238, 256, 262), grandchild levels (e.g., the level associated with action indicator 244 is a grandchild with respect to the level associated with action indicator 226), and so on.

Furthermore, it is noted that while FIG. 3A shows utilization of the step analysis logic 314 at a particular point in the flow of process 300, it should be understood that the functionality of the step analysis logic 314 may be utilized multiple times by the process 300, such as each time that a new level type is encountered. For example, the step analysis logic 314 may be initially utilized with respect to the level associated with action indicator 220 and no grandchild levels may be identified during traversal of elements displayed within the tree view upon expansion of that level in response to activation of action indicator 220. When the process 300 encounters the level associated with the action indicator 238 and expands that level, process 300 may utilize the step analysis logic to determine the appropriate offset for traversing the grandchild levels displayed upon activation of the action indicator 238 (e.g., the level associated with action indicator 244). Accordingly, it should be understood that while FIG. 3A shows specific transitions between the various functional blocks utilized for analyzing and automating UI interactions involving tree views, such transitions are provided for purposes of illustration, rather than by way of limitation and other sequences of applying the functionality provided by the process 300 may be utilized to automate UI interactions with tree views in accordance with aspects of the present disclosure.

Once the various parameters described above have been initialized, the process 300 may proceed to validation logic 316, which may be configured to evaluate whether the current region (e.g., the region defined by CurrentX, CurrentY, CurrentW, CurrentH) includes the area of interest for the action to be executed. In an aspect, evaluating whether the area of interest is within the current region of the tree view may include performing OCR to extract text within the current region and comparing the extracted text to text data included in the input data 304. In additional or alternative implementations other types of information may be considered by validation logic 316 (e.g., icons, symbols, or other information that may be used to identify the region of interest). If the extracted text matches the text data (or other types of information) included in input data 304, processing may proceed to type analysis logic 318. Type analysis logic 318 may be configured to determine whether the action is identified based on the matched text (or other types of information considered by validation logic 316) or an icon. For example, actions involving expansion and/or collapsing of the tree view of FIG. 2B may be identified based on the action indicators while activation of targets 248, 266 may be identified based on their labels (e.g., based on the text matched by validation logic 316).

If the type analysis logic 318 determines, based on the input data 304, that the action is to be performed based on matching text, process 300 may proceed to action execution logic 320, where the action indicated in the input data 304 may be executed, such as to execute a click action on the matched text. Alternatively, if the type analysis logic 318 determines, based on the input data 304, that the action is to be performed based on matching an icon (i.e., the icon is the target for performing the action), process 300 may proceed to icon verification logic 322, which may be configured to determine whether the icon (e.g., one of the icons 222, 228, 234, 240, 246, 252, 258, 264 of FIG. 2B) that is the target for performing the action indicated in the input data 304 is present in the current region. If the icon is present, process 300 proceeds to action execution logic 320, where the action indicated in the input data 304 may be executed, such as to execute a click action on the matched icon.

If the icon is not present, process 300 proceeds to tree view mapping logic 324. The tree view mapping logic 324 may be configured to generate a map of the tree view. For example, the map may be stored as tree view data and information associated with the current region of the tree view (e.g., TreeViewData.Text=text analyzed by the validation logic 316 and TreeViewData.Icon=the icon analyzed by the icon verification logic 322) may be stored in the map in association with the location data (e.g., CurrentX, CurrentY, CurrentW, CurrentH). Subsequent to storing the map data, process 300 may proceed to step logic 326. Step logic 326 may be configured to determine whether the end of the scanned portion of the tree view has been reached (e.g., either the end of the tree view or only the end of the scanned portion of the tree). In an aspect, determining whether the end of the scanned portion of the tree view has been reached may be calculated as CurrentY+StepY>Ty+Th.

If step logic 326 determines the end of the scanned portion of the tree view has not been reached (e.g., CurrentY+StepY<Ty+Th), process 300 proceeds to expansion logic 344. The expansion logic 344 may be configured to determine if an expand icon is present in the region associated with Tx, CurrentY, FCx, CurrentH. In this manner, when a current level or row of the tree view is analyzed and determined not to be the area of the tree view of interest (i.e., the area of interest identified based on the input data 304), the process 300 proceeds to expansion logic 344, which may be configured to determine whether the current level or row of the tree view is expandable or not. If the expansion logic 344 detects the expansion icon, process 300 may proceed to action logic 352, which activates the expansion icon to expose additional levels or rows of the tree view. Subsequently, process 300 proceeds to child region logic 354. Child region logic 354 may be configured to update the values of CurrentX, CurrentY, CurrentW, CurrentH to set the current region for consideration to the newly revealed child. In an aspect, setting the current region may be expressed as CurrentX=CurrentX+StepX, CurrentY=CurrentY+StepY, CurrentW,=CurrentW−StepY, and CurrentH=CurrentH. Once the current region is configured by child region logic 354, process 300 may proceed to iteration block 350, which indicates a new region for analysis has been identified, and then to validation logic 316 where processing may proceed as described above.

If the expansion logic 344 does not detect the expansion icon, process 300 may proceed to collapse logic 346. If the collapse logic 344 detects a collapse icon (i.e., the current level of the tree view is in the expanded state), process 300 may proceed to child region logic 354 where the current region may be updated as described above (e.g., moving to the next child of the currently expanded portion of the tree view). If the collapse logic 344 does not detect the collapse icon, process 300 may proceed to child region update logic 348. Similar to child region logic 354, the child region update logic 348 may be configured to update the values of CurrentX, CurrentY, CurrentW, CurrentH to set the current region for consideration to a next child (e.g., a next row or level of the currently expanded portion of the tree view). In an aspect, child region update logic 348 may set the current region according to CurrentX=CurrentX (e.g., because the next child should have the same "x" as all other children in the current level of the tree view), CurrentY=CurrentY+StepY (e.g., the vertical position of the next child differs from the prior child (or parent or root) by StepY), CurrentW, =CurrentW, and CurrentH. Once the current region is configured by child region update logic 348, process 300 may proceed to iteration block 350, which indicates a new region for analysis has been identified, and then to validation logic 316 where processing may proceed as described above. As can appreciated from FIG. 3A, as process 300 cycles through child rows or levels of the tree view, each row or level may be evaluated to determine whether the area of interest of the tree view specified in the input data 304 is present via validation logic 316, and a map of the tree view may be generated as the tree view is traversed via mapping logic 324.

If step logic 326 determines the end of the scanned portion of the tree view has been reached (e.g., CurrentY+StepY>Ty+Th), process 300 proceeds to scrolling logic 328, where a scroll action is simulated to display (or scan) additional rows or levels of the tree view. In an aspect, the scroll may be executed or simulated by adjusting the vertical pointer (CurrentY) based on a number of items impacted by the scrolling. For example, the position of the vertical pointer may be adjusted according to X=Tx+Tw−(SBw/2) and Y=Ty+Th−(FCh/2), where SBw represents the width of a scroll bar (shown in FIGS. 2B, 3B, and 3C) and may be determined using the RCNN model or based on standard UI element sizes, Tx and Ty represent the starting point(s) of the tree view horizontally (Tx) and vertically (Ty) on the screen, and Tw and Th represent the total width and total height, respectively, of the tree view. In this manner, a "scroll down" icon in bottom right of the tree view may be located, as described in more detail below with reference to FIGS. 3B, 3C. It is noted that the exemplary calculation described above includes subtraction of SBw/2 and FCh/2 from the X and Y values, respectively, which may be used to move the cursor towards the center of the scrolling target (e.g., the scroll down icon). It is noted that the exemplary techniques to calculate the location for the scroll icon have been provided for purposes of illustration, rather than by way of limitation and that scrolling logic 314 may utilize other techniques to identify the location of the scrolling icon, such as using the RCNN model to detect the location of the "scroll down" icon (e.g., element 274 in FIG. 2B) or another technique. For example, the scroll down icon is typically located in the bottom right region of a UI. As such, a region where the scroll down icon is expected to be located may be determined based on characteristics (e.g., Tx, Ty, Tw, Th) of the tree view, such as a region bound by (Tx+Tw/2, Ty+Th/2) and (Tx+Tw, Ty+Th). The RCNN model may then be used to detect the precise location of the scroll down icon using computer vision techniques, as described above, and then activate the scroll down icon one or more times to perform scrolling.

Alternatively or additionally, an action simulating a user depressing a down arrow key may also be used to perform scrolling (e.g., the scrolling logic 314 may execute a down arrow key command and then determine how much the tree view moved using the techniques described above). Once the scrolled distance for one activation of the down arrow key is determined, the scrolling logic 314 may perform a number of down arrow key activations to scroll through portions of the tree view. It is noted that the exemplary techniques for simulating scrolling operations using computer vision techniques as described above are provided for purposes of illustration, rather than by way of limitation and that other techniques may be utilized and UI automations created in accordance with the concepts described herein, such as horizontal scrolling using left/right scroll icons or arrow keys.

Figure 3B:
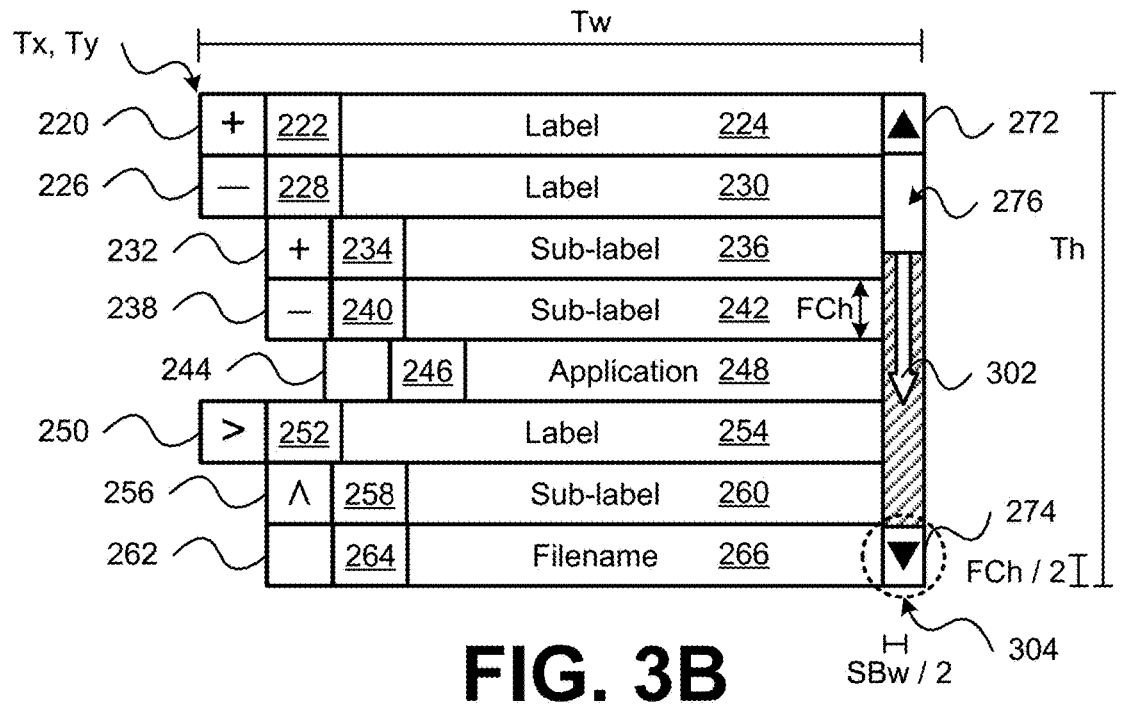
FIG. 3B is a block diagram illustrating an exemplary aspects of an automated scrolling process according to one or more aspects of the present disclosure.
Figure 3C:
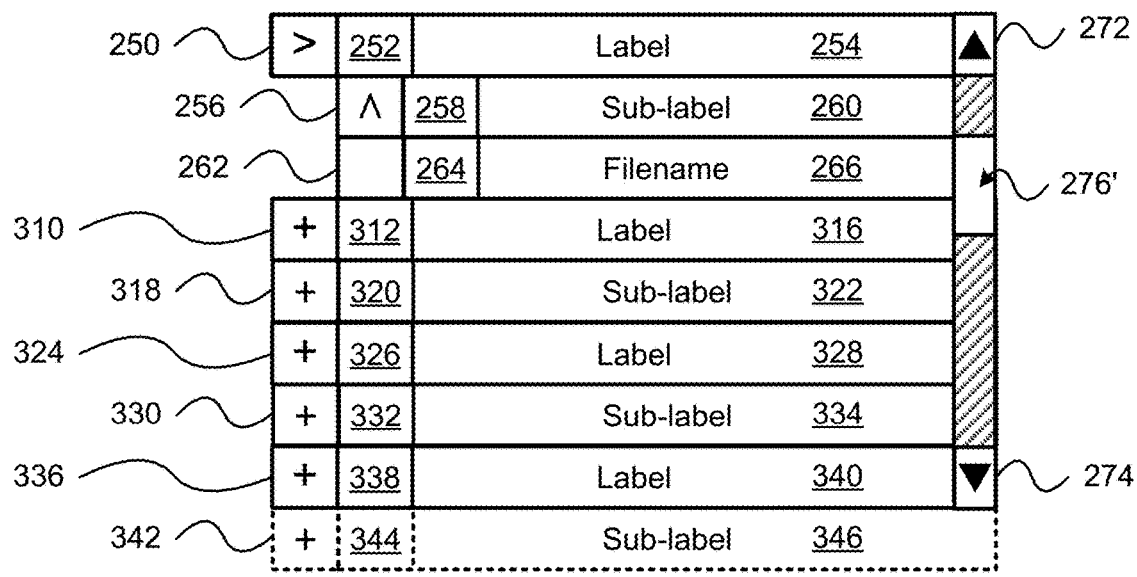
FIG. 3C is a block diagram illustrating an exemplary aspects of an automated scrolling process according to one or more aspects of the present disclosure.

As an illustrative example and with reference to FIG. 3B, to perform a scrolling operation the scrolling logic may activate (e.g., click) icons of a scroll bar associated with the tree view. For example, the exemplary tree view shown in FIG. 2 includes a scroll bar 270 that includes icons 272, 274 and a slider 276. To scroll the tree view, a user may click-and-hold on the slider 276 and move the slider 276 up or down to scroll the tree view and display additional levels. Alternatively, the user may click or click-and-hold on the icon 272 to scroll the tree view up, or click or click-and-hold on the icon 274 to scroll the tree view down. If the scrolling logic 314 has traversed the tree view until the level associated with the action indicator 262 and has not detected the target of interest for the UI interaction being executed, the scrolling logic 314 may determine the location of the icon 274 using the above-described techniques (or the RCNN) and may click on (indicated by circle 304) the icon 274 a number of times to scroll the tree view in the direction indicated by arrow 302. After the scrolling, the tree view may be as shown in FIG. 3B, where the slider has moved down, shown as slider 276' to indicate the new location of the slider 276 relative to FIGS. 2B and 3A, and additional levels of the tree view are displayed. In the example shown in FIG. 3C, the additional levels displayed as a result of the scrolling include a level associated with an action indicator 310, an icon 312, and a target 316, a level associated with an action indicator 318, an icon 320, and a target 322, a level associated with an action indicator 324, an icon 326, and a target 328, a level associated with an action indicator 330, an icon 332, and a target 334, and a level associated with an action indicator 336, an icon 338, and a target 340. Additional scrolling may also be performed (e.g., until the action target is identified) to cause additional levels of the tree view to be displayed for analysis. For example, in FIG. 3C, the tree view includes a level (shown in dashed lines to indicate it is not visible on screen) associated with an action indicator 342, an icon 344, and a target 346, which may be displayed by scrolling further down via the scroll bar 270.

After the scrolling operation is complete, process 300 may proceed to iteration logic 330, which may be configured to identify the last region (e.g., a last row or level) of the tree view that has been compared to the input data (e.g., the level associated with action indicator 262 in the scrolling example described above with reference to FIGS. 3A-3C). For example, each iteration may proceed from iteration logic 330 to the type analysis logic 332, which may be configured to determine, after the scrolling, whether a waypoint or checkpoint (e.g., the last mapped data of the tree view by mapping logic 324) within the tree view is identifiable based on text only or based on text and an icon. When the waypoint is identifiable based on based on text only, process 300 may proceed to text validation logic 334, which may function to determine whether a current region of the tree view includes TreeViewData.Text, and when the waypoint is identifiable based on text and an icon, process 300 may proceed to text and icon validation logic 340, which may function to determine whether the current region of the tree view includes TreeViewData. Text and TreeViewData.Icon.

After execution of either text validation logic 334 or text and icon validation logic 340, process 300 may proceed to matching logic 336. Matching logic 336 may be configured to determine whether the current region corresponds to the waypoint configured by mapping logic 324 (e.g., whether the current region matches TreeViewData.Text based on text validation logic 334 or TreeViewData.Text and TreeViewData.Icon based on text and icon validation logic 340). If a match is not detected by matching logic 336, process 300 may proceed to increment row logic 342, which may maintain a counter (e.g., RowCounter). Each time the process 300 arrives at the increment row logic 342 the counter may be incremented (e.g., to count the number of rows that were scrolled in the scrolling operation) and the process 300 transitions back to iteration logic 330. If matching logic 336 identifies a match, the process 300 may proceed to increment logic 338, which may be configured to calculate a new value for CurrentY. In an aspect, the new value for CurrentY may be calculated according to CurrentY=CurrentY−(RowCounter*StepY). After the new value for CurrentY is calculated by increment logic 338, process 300 may proceed to expansion logic 344 and proceed as described above.

As shown above, the process 300 operates to receive input data specifying an area of interest of a tree view, such as a particular row or level of the tree view, and operates to dynamically traverse the different levels of the tree view to identify the area of interest for the tree view. As each level or row of the tree view is analyzed, it may be determined whether the current area or region of the tree view being analyzed corresponds to the area of interest specified in the input data and provides functionality for automatically executing the action if the area of interest is detected. During traversal of the tree view, process 300 provides functionality for expanding different portions of the tree view to expose additional levels or rows of the tree view for further analysis and may perform scrolling operations to facilitate scanning of additional portions of the tree view as needed. Using the above-described techniques, UI interactions involving tree views may be automatically executed. It is noted that while various calculations and techniques have been described with respect to identifying locations associated with portions of the tree view that are of interest for particular functionality (e.g., icon analysis, text analysis, etc.) of the process 300, in some aspects the RCNN model may be utilized to identify regions of interest for analysis, rather than using the non-limiting and exemplary calculations described herein (e.g., step size calculations, scrolling operations, and the like).

Furthermore, it is noted that the process 300 provides a robust approach to automation of UI interactions for tree views and that is resilient to changes in the tree view. For example, suppose that in one execution of the sequence of UI interactions that the area of interest corresponds to the row of the tree view of FIG. 2B that includes action indicator 244, icon 246, and target 248. Using the above described process 300, the tree view may be identified, and appropriate expansions performed until the target row of the tree view (e.g., the row that includes action indicator 244, icon 246, and target 248) is identified by validation logic 316 (and potentially icon validation logic 322). Moreover, the input data 304 used to detect the row that includes action indicator 244, icon 246, and target 248 may also be used to repeatedly perform the action (e.g., launch the application associated with target 248) despite subsequent executions of the automated UI sequence in which the tree view is modified so that the target 248 is presented within a different row or level of the tree view, such as a child of the row associated with action indicator 232. To execute the action in this modified tree view arrangement, the process 300 may simply traverse through the tree view as described above, which may involving expanding the tree view using action indicators 220, 226, 234, and then traversing down the child levels or rows until the target 248 is located. Thus, the process 300 is capable of handling dynamic content and enables new forms of UI interactions to be performed in an automated manner, such as automated scrolling of UIs in a manner that is similar to the way a user would interact with a UI and without missing any elements of interest in the UI.

An additional advantage provided by process 300 is that is requirement minimal inputs. For example, as described above with reference to the input data 304, input to process 300 merely includes information about the area of interest (e.g., text and/or icon information, action type, etc.) and process 300 can then traverse the tree view to identify that target and execute the action. This is unlike prior UI automation techniques that require the sequence of UI interactions to specify all actions to be automated. For example, to automate a UI interaction sequence to launch the application associated with target 248, the input data may require specifying action indicator 226 is to be activated, then action indicator 238 is to be activated, and then the target action to launch the application associated with target 248 is executed. Also, if the location of target 248 within the tree view changes, such as if the parent level associated with action indicator 238 gets another element that is above the row for target 248, the sequence of UI interactions generated using previous UI automation techniques will fail or must be completely regenerated, as such automation techniques do not possess the ability to autonomously handle dynamic or changing UI content.

Figure 4:
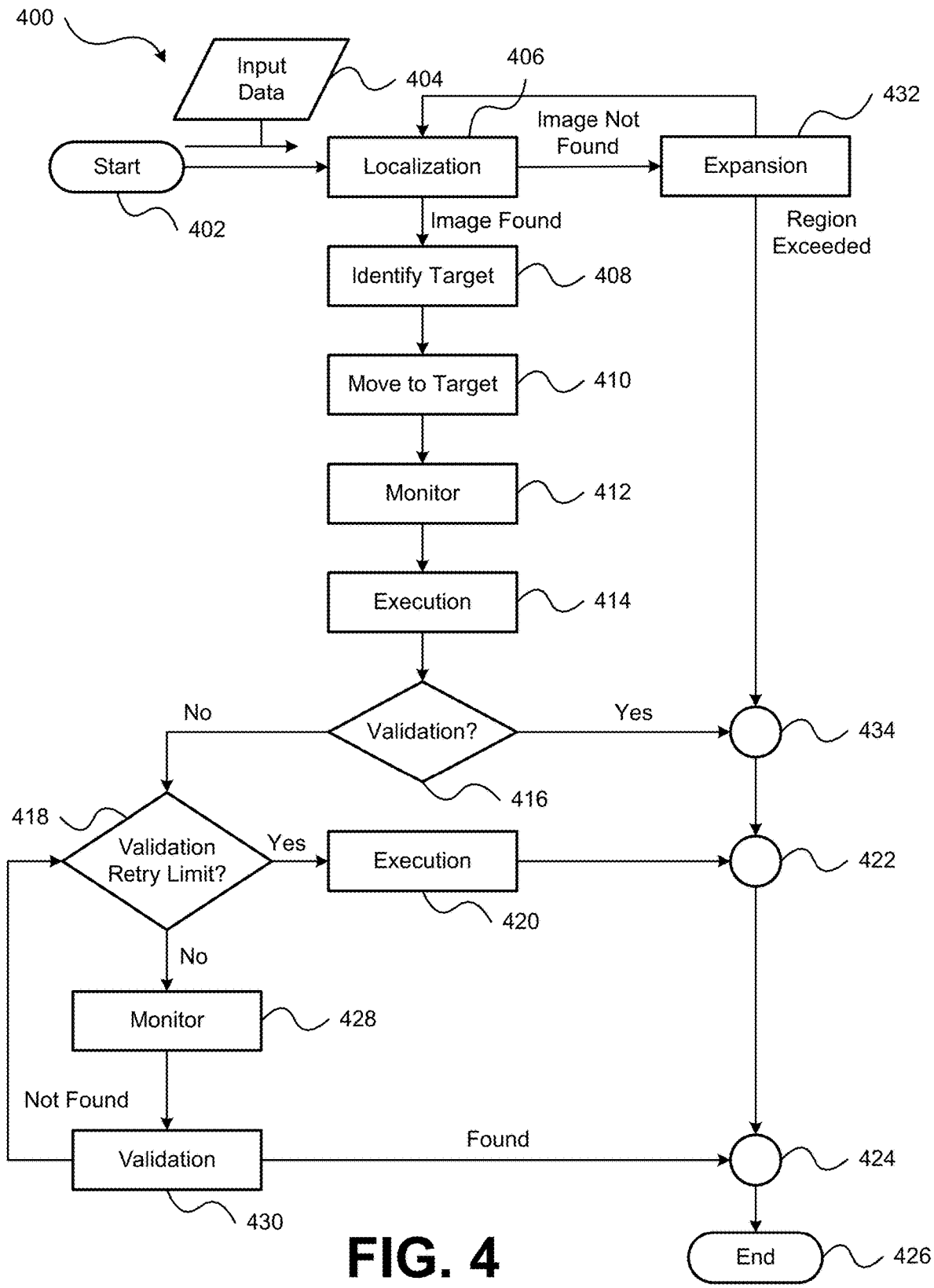
FIG. 4 is a flow diagram illustrating an exemplary process for automation of UI tasks according to one or more aspects of the present disclosure.

Referring to FIG. 4, a flow diagram illustrating an exemplary process for automation of UI tasks according to one or more aspects of the present disclosure is shown as a process 400. More particularly, the process 400 illustrates techniques for automating UI interactions involving actions involving a particular control element, such as the controls 204, 208, 212, 216 of FIG. 2A, according to aspects of the present disclosure. The process 400 may begin at block 402, where input data 404 is received. The input data 404 may include information associated with a UI element of interest. For example, the input data 404 may be generated using the capture techniques described above with reference to FIG. 1 and may include image data, location data, and validation data. In an aspect, the image data may include image data captured during the hovering period, as described above with reference to FIG. 1 (an potentially expanded image data as described with reference to controls 204 and 208 of FIG. 2A). The location data may identify a region of the UI where the target control (e.g., the target control depicted in the image data) is expected to be positioned and may be specified as Rx, Ry, Rw, Rh, where Rw, Ry represent (x, y) coordinates associated with the control and Rw, Rh represent the height (e.g., in pixels or another metric) of the region bounding the control. The validation data may include pre-validation data, post-validation data, or both pre- and post-validation data. The pre-validation data may include image data (e.g., an image depicting the control or other aspects of the state of the UI when the action can be executed on the target control, text data (e.g., a label associated with the control), or other information. The post-validation data may include image data (e.g., an image depicting the state of the UI when the action can be executed on the target control), text data displayed when the control is executed, such as a confirmation message), location information (e.g., an expected location within the UI where the image data and/or text data should be presented upon successful execution of the action), or other information. The input data 404 may also include action data that specifies an action type, such as a click action, a data entry action, and the like. When the action type is a data entry action, the input data 404 may also include a data payload, which may include text that should be input via the data entry action, such as text to be input to a data field (e.g., data field 208 or data field 216 of FIG. 2A).

As shown in FIG. 4, the input data 404 may be provided to localization logic 406. Localization logic 406 may be configured to locate the target control based on the image data and location data of the input data 404. For example, the localization logic 406 may utilize the image data, the location data, and the RCNN model of the automation engine 120 of FIG. 1 to determine whether the target control is present at the region specified by the location data. If the control is not detected, process 400 may proceed to expansion logic 432, where the region in which the process 400 attempts to locate the target control is expanded (i.e., the region defined by Rx, Ry, Rw, Rh is expanded) to provide a larger search space for locating the target control. In an aspect, the expansion may utilize a pre-determined step size, such as to increase Rx, Ry, Rw, Rh by a number pixels (e.g., 10 pixels, 20 pixels, 50 pixels, 100 pixels, or some other unit of measure). After an initial expansion of the search region by the expansion logic 432, the process 400 may return to localization logic 406 and the expanded region may again be analyzed using the RCNN model and the image data to determine whether the control is present in the expanded region. If the control is not found within the expanded search region, process 400 may iteratively expand the search region as described above with reference to expansion logic 432 until a region limit is reached. In an aspect, the region limit may correspond to a screen limit (e.g., the search region cannot exceed the resolution of the screen on which the UI is displayed). If the region limit is reached and the control has not been found, process 400 may finish, as shown at blocks 422, 424, 426, and 434.

If localization logic 406 detects the target control in the original or expanded search region, process 400 may proceed to target identification logic 408. Target identification logic 408 may be configured to identify a central point (CP) of the target control, which may be expressed as CPx, CPy. Once the central point is identified by target identification logic 408, process 400 may proceed to move to target logic 410. The move to target logic 410 may be configured to generate instructions for moving an action initiating element (e.g., a cursor of a mouse, etc.) to the target control. In an aspect, the action initiating element may be moved to the location defined by CPx, CPy. It is noted that in some aspects the central point may correspond to a center of the target control, while in other aspects the central point may merely represent a location that is within the boundaries of the actionable area of the control. Once the instructions are generated, the move to target logic 410 may execute the instructions to move the action initiating element to the central point.

While the instructions are being executed to move the action initiating element to the central point, process 400 may proceed to monitoring logic 412. Monitoring logic 412 may be configured to delay execution of an action (e.g., the action indicated in the input data 404) for a period of time. The period of time may correspond to an amount of time required to complete movement of the action initiating element to the central point, which may be less than 1 second, between 1 and 3 seconds, between 1 and 10 seconds, or some other time interval. In some aspects, the period of time in which execution of the action is delayed may also be utilized to verify pre-validation data included in the input data 404. When pre-validation data is utilized, the RCNN model may be utilized to evaluate whether the state of the UI indicates the target control is ready to be activated via execution of the action. As a non-limiting example, the pre-validation data my include image data showing the cursor at the central point or somewhere over the interior of the target control and the RCNN model may be utilized to verify the cursor has been successfully moved over the target control. In some aspects, the period of time for delaying the execution of the action may be dynamic, rather than a pre-determined amount of time, such as to wait for detection that the target control is in a validated state based on the pre-validation data.

After the time period for delaying the action is complete, the process 400 may proceed to execution logic 414 and the action may be performed (e.g., the control may be clicked). Once the action is executed, process 400 may proceed to validation logic 416, which may be configured to determine whether the action was successfully executed based on the post-validation data. For example, the validation logic 416 may be configured to use the RCNN model to determine whether the state of the UI matches the state of the UI indicated in the image data, text data, or other types of information included in the post-validation data. If the validation logic 416 determines that the action was executed successfully, process 400 may be completed as to the action indicated in the input data 404 and process 400 may proceed to block 426 via blocks 422, 424, 434.

If the validation logic 416 determines that the action was not executed successfully, process 400 may proceed to validation retry logic 418. Validation retry logic 418 may be configured to maintain a counter representing a number of attempts that have been made to perform post-validation after the action was executed by action execution logic 414. When activated, validation retry logic 418 may initialize the counter and process 400 may proceed to monitoring logic 428, which may be configured to wait for a period of time (e.g., between 1 and 3 seconds, between 1 and 10 seconds, or some other time interval). Once the period of time is over, process 400 may proceed to validation logic 430, which may be configured to use the RCNN model to determine whether the state of the UI matches the state of the UI indicated in the image data, text data, or other types of information included in the post-validation data, as described above with reference to validation logic 416. If the validation logic 416 is able to validate the action was completed successfully, process 400 may proceed to block 426 via blocks 422, 424, 434. If validation logic 416 is unable to validate the action was completed successfully, process 400 may be returned to validation retry logic 418 and the counter may be incremented. This process may continue until the value of the counter exceeds a retry threshold (e.g., a maximum number of retry attempts that may be made before attempting to execute the action again). Once the counter reaches the retry threshold, process 400 may proceed to execution logic 420, where the action may be executed again.

It is noted that the process flow shown FIG. 4 may be modified in several ways depending on the number of attempts that should be made to execute the action, the number of attempts that should be made to perform post-validation, and the like. As such, it should be readily recognized that, rather than proceeding to block 426 after execution logic 420 executes the action, process 400 may proceed from execution logic 420 to validation logic 416 or monitoring logic 428, and the various validation steps may be performed again. In such an arrangement, if the action has not been validated as successful when the retry threshold is reached, process 400 may fail and proceed from validation retry logic 418 to block 426. Additional modifications or changes may also be made, as will be apparent to one of ordinary skill in the art.

As shown above, the process 400 of FIG. 4 provides a technique for locating a UI element upon which an action is to be performed in a manner that provides thorough validation. Furthermore, process 400 provides capabilities to expand the search region for locating the UI element in the event it is not found in an expected position or region of the UI, thereby enabling process 400 to automate UI interactions despite the presence of dynamic content or changes to the arrangement of elements within the UI. Moreover, by providing both pre- and post-validation functionality, the action may be more likely to be executed when the UI is ready to accept input (e.g., execution of the action), and performance of the action may be verified, thereby preventing failure of the automated sequence of UI interactions due to potential performance issues. It is noted that an automated sequence of UI interactions may involve multiple executions of the process 400, each execution corresponding to a different UI interaction. Accordingly, it should be understood that FIG. 4 has been described with respect to executing a single action for purposes of illustration, but that additional actions may be performed in the same manner as described above.

Figure 5:
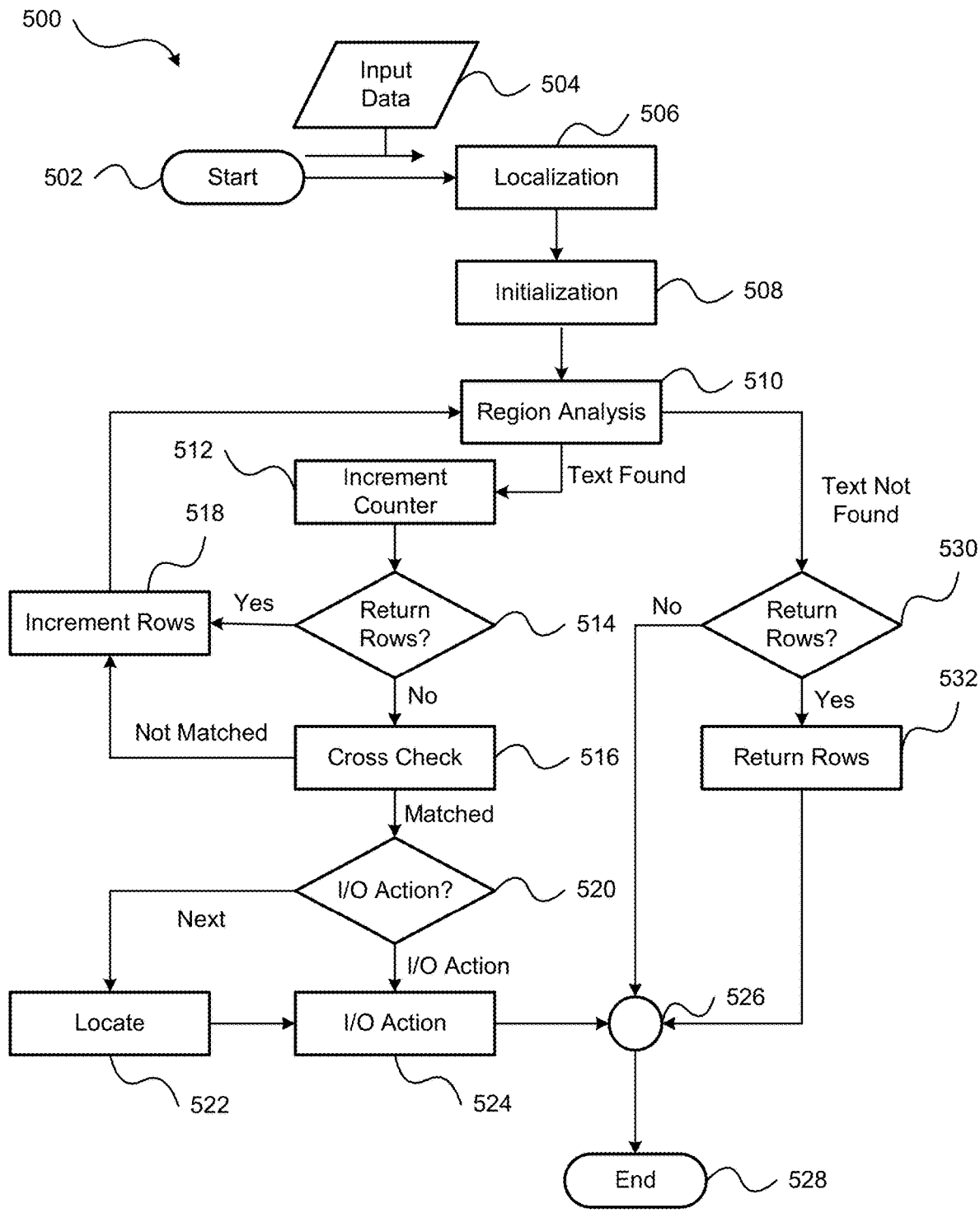
FIG. 5 is a flow diagram illustrating an exemplary process for automation of UI tasks according to one or more aspects of the present disclosure.

Referring FIG. 5 is a flow diagram illustrating an exemplary process for automation of UI tasks according to one or more aspects of the present disclosure as process 500. More particularly, the process 500 illustrates techniques for automating UI interactions involving data grids or lists according to aspects of the present disclosure. The process 500 may begin at block 502, where input data 504 is received. The input data 504 may include information associated with a UI element of interest, such as a particular element of a data grid, a list, or other types of UI presentations that may utilize data organized into rows and columns. The input data 504 may be generated using the capture techniques described above with reference to FIG. 1 and may include image data, header data, location data, action type data, action data, or other types of information. In an aspect, the image data may include image data captured during the hovering period, such as an image of a header of a column of a data grid, as described above with reference to FIG. 1. The header data may include information that may be used to identify a particular column of the data grid, such as the text of the column header. The location data may include information associated with dimensions of the column, such as Ch, Cw, where Ch represent the height (e.g., in pixels, rows, or another metric) of the column and Cw represents the width of the column. The location data may also include row offset data, which may specify and x, y offset (e.g., Offsetx, Offsety) for the data rows, which may provide information for traversing through different data rows of the specified column. The action type data may include information that specifies a type of action to be performed on the target row, such as a click, read, next column click, next column read, return all rows, or some other action. The action data may specify a target region of the data grid upon which the action type is to be executed, such as a particular row number, a row having particular text, a row having particular next column data (next column offset, or next column width), or other types of data.

The input data 504 may be provided to localization logic 506, where the RCNN model may be utilized to locate the column associated with the image and/or header data of the input data 504. Once located, coordinates of the column header may be determined as Cx, Cy. After determining the location of the column header, process 500 may proceed to initialization logic 508. The initialization logic 508 may be configured to initialize parameters that may be used to traverse through the rows of the column. For example, the parameters may include Colx and Coly, which may be initialized as follows: Colx=Cx+Cw; Coly=Cy+Ch, which may represent a region of the data grid that corresponds to the first row below the column header (e.g., Cy is the vertical position of the column header and adding Ch offsets the region associated with the column header (starting from the vertical position Cy) by the row height). A row counter may also be initialized by the initialization logic 508. In an aspect, the row counter may be initialized to zero.

Following initialization of the parameters, process 500 may proceed to region analysis logic 510, which may be configured to utilize image and/or character recognition techniques (e.g., the RCNN model described with reference to FIG. 1 and/or OCR techniques) to detect text in the current region (e.g., the region defined by {Colx+Offsetx, Coly+Offsety, Cw, Ch}). If text is detected by the region analysis logic 510, process 500 may proceed to increment row counter logic 512 and the row counter initialized by initialization logic 508 may be incremented by 1. Subsequently, process 500 may proceed to return rows logic 514 where a determination is made as to whether the action specified in the input data 504 is a return all rows action (e.g., all rows of the column are to be returned as an output of process 500). If the action is a return all rows action, process 500 may proceed to increment rows logic 518, where the vertical position of the region of consideration may be incremented to the next row. In an aspect, the incrementing of the region may be expressed as Coly=Coly+Ch. After incrementing the region, the process 500 may proceed to region analysis logic 510 where processing may repeat using the new region associated with the incremented row.

If the action is not a return all rows action, process 500 may proceed to cross check logic 516. The cross check logic 516 may be configured to determine whether a current row or text of the row matches a row or row text specified in the input data 504 (e.g., as action data). If cross check logic 516 does not identify a match with the action data, process 500 may proceed to increment rows logic 518, where the vertical position of the region of consideration may be incremented to the next row. In an aspect, the incrementing of the region may be expressed as Coly=Coly+Ch. After incrementing the region, the process 500 may proceed to region analysis logic 510 where processing may repeat using the new region associated with the incremented row.

If cross check logic 516 identifies a match (i.e., the row number or row text corresponds to a portion of the action data that identifies a row for which an action is to be performed), process 500 may proceed to input/output (I/O) action logic 520, where a determination may be made as to whether the action to be performed is an I/O action (e.g., a read action, a write action, etc.) or a next column action (e.g., a next column read or next column write action). If the action is an I/O action, the process 500 proceeds to I/O action logic 524 where the I/O action may be performed, such as to read out the text of the current row (or cell) of the data grid or write data to the row (or cell) of the data grid, and the process 500 may proceed to end via blocks 526, 528. If the action is a next column action, the process 500 proceeds to column locate logic 522. The column locate logic 522 may be configured to locate the next column using NextColData[NextColOffset, NextColWidth]. Once the next column is located, process 500 proceeds to I/O action logic 524 and the action may be executed (e.g., the next column data may be read or data may be written to the next column), and the process 500 may proceed to end via blocks 526, 528.

If region analysis logic 510 does not detect text within a current region, process 500 may proceed to return rows logic 530 where a determination is made as to whether the action is a return rows action. If the action is not a return all rows action the process 500 may terminate, as shown by blocks 526, 528. However, if the action is a return all rows action, process 500 may proceed to return rows logic 532, where all rows detected as having text may be output. In some aspects, outputting the rows detected (e.g., by region analysis logic 510) as containing text may include outputting only the detected text. In additional or alternative aspects, outputting the detected rows may include outputting the detected text and location information (e.g., Rx, Ry, Rw, Rh) for each identified row. It is noted that while described as outputting rows containing text, in some aspects, the return rows action may be used to return numeric data, alpha-numeric data, or other types of information. Furthermore, the return rows action may also be configured to return all rows containing specific data (e.g., text specified in the input data 504, a number or sequence of numbers specified in the input data 504, etc.), which may enable automated extraction of data from a data grid at a more granular level, such as to test functionality for searching the data grid for entries associated with a specific customer (e.g., return rows containing a customer ID) or other types of data grid searches. Moreover, it is noted that in some aspects cells of the data grid may include icons and the process 500 may be configured to locate a target icon (e.g., by specifying the target icon in the input data 504) and to execute an action on the target icon, such as a click (e.g., by specifying a click action type in the input data 504).

As shown above, process 500 provides a technique for automating UI interactions involving tabular data (e.g., data organized into rows and columns). In some aspects, process 500 may utilize other types of functionality disclosed herein to facilitate automation of UI interactions with data grids. For example, the RCNN model may be used to locate a scroll bar of the UI and perform scrolling operations. As described above with reference to FIG. 3A, a way point may be configured prior to scrolling, which may provide a reference point for resuming analysis of the data grid once the scrolling operation is complete. To facilitate output of row data (e.g., via a return rows action), process 500 may generate a runtime map of all data detected as the data grid is scanned. The runtime map may also be used to detect the resume point to extend the search after scrolling the content. The above-described capabilities and functionality impart new capabilities for UI automation that are not feasible using presently available techniques. For example, while the ability to use OCR to read data from a data grid exists, systems providing such functionality are limited to extracting data via OCR from a particular region and do not include capabilities to intelligently traverse rows of a data grid to locate specific contents of a row. Thus, existing techniques are incapable of handling data grids where the data presented in the rows may be dynamic or change from one execution to the next. In contrast, the process 500 includes the ability to intelligently search a data grid row-by-row to identify regions of interest (e.g., based on the input data 504) and perform actions upon locating the regions of interest. Moreover, prior techniques do not possess functionality for performing scrolling operations, thereby limiting the size of data grid for which automated functionality may be provided. As explained above, process 500 provides various features and functionality that enable automation of UI interactions involving data grids of any size (e.g., due to the ability to utilize scrolling via the RCNN model and capturing waypoints).

Figure 6:
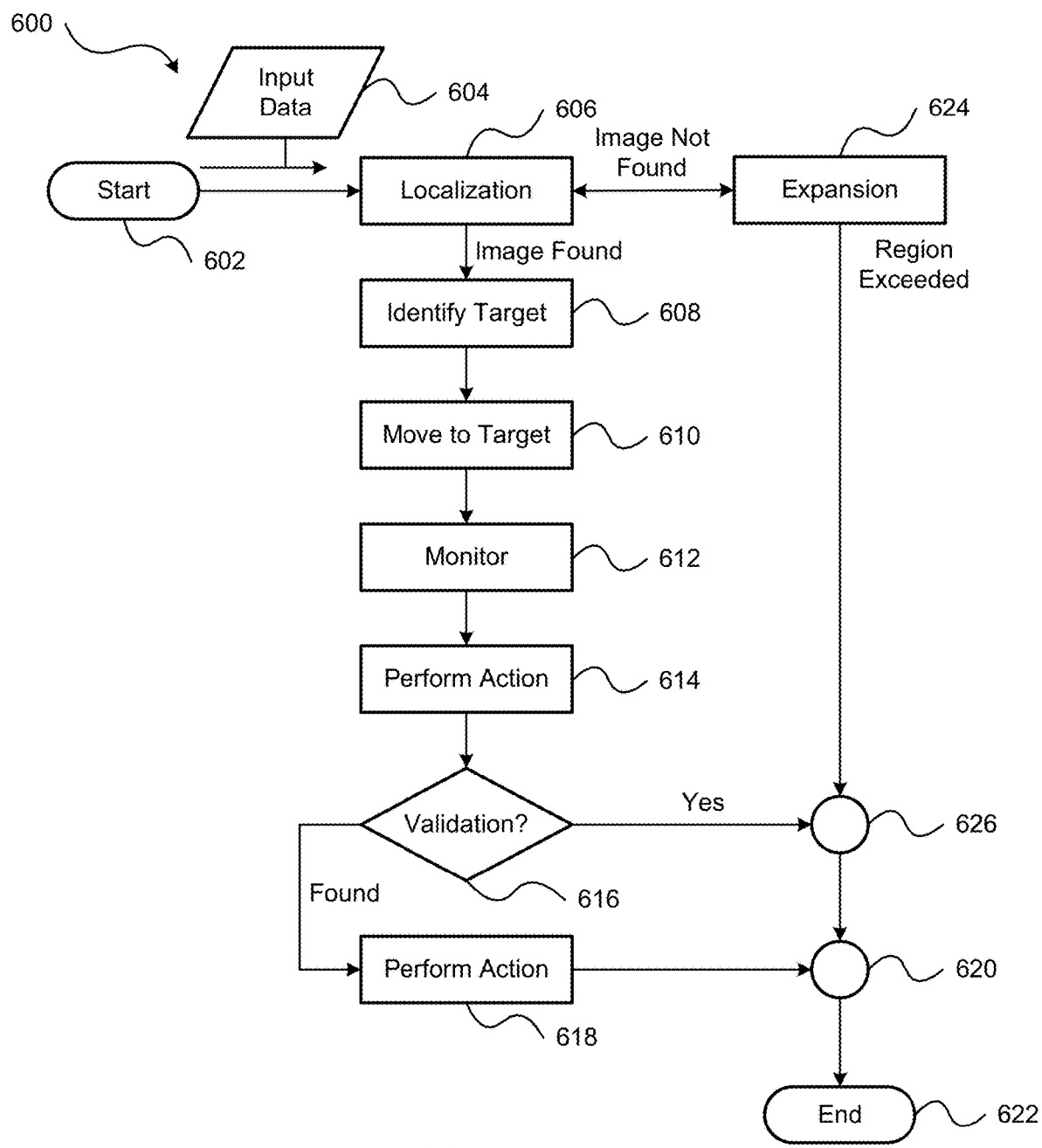
FIG. 6 is a flow diagram illustrating an exemplary process for automation of UI tasks according to one or more aspects of the present disclosure.

Referring FIG. 6 is a flow diagram illustrating an exemplary process for automation of UI tasks according to one or more aspects of the present disclosure is shown as a process 600. More particularly, the process 600 illustrates techniques for automating UI interactions involving UI elements that may or may not be actionable according to aspects of the present disclosure. For example, in many form-based UIs the user may be required to input data to certain fields before a submit button becomes actionable. In other UIs data fields may be presented but may not be editable (e.g., because a prior data field may need to receive data first, another control may need to activated before data can be input to the data field, etc.). Prior UI automation techniques may compare a greyed-out image cutout of the control to the UI to confirm if the control (e.g., a button, a dropdown, a data field, etc.) is actionable or not. However, many such UI elements may not change appearance based on whether they are actionable or not and so existing techniques are incapable of handling certain types of UI elements (e.g., prior techniques may attempt to input data to a data field that is not in an actionable or editable state), which may cause execution of the automated sequence of UI interactions to fail. As described in more detail below, the process 600 solves the problems that exist in existing UI automation techniques with respect to determining whether a control is actionable or not.

The process 600 may begin at block 602, where input data 604 is received. The input data 604 may include information for identifying the UI element and action of interest, such as the various types of data described above with reference to input data 404 of FIG. 4. The input data 604 may be provided to localization logic 606, which may be configured to determine, based on the input data 604, whether the UI element of interest is present in expected region of the UI. For example, the input data 604 may include image data of the UI element of interest and location information, specified as Rx, Ry, Rw, Rh, associated with the expected region where the UI element will be presented within the UI. Using the RCNN model described with respect to the automation engine 120 of FIG. 1, the UI may be scanned at the expected region and a determination may be made as to whether the UI element is present. If the UI element is not present, process 600 may proceed to expansion logic 624. As described above with reference to expansion logic 432 of FIG. 4, the expansion logic 624 may be configured to expand the region in which to search for the UI element of interest by incrementing the location information. In an aspect, the expansion may utilize a pre-determined step size, such as to increase Rx, Ry, Rw, Rh by a number pixels (e.g., 10 pixels, 20 pixels, 50 pixels, 100 pixels, or some other unit of measure). After an initial expansion of the search region by the expansion logic 624, the process 600 may return to localization logic 606 and the expanded region may again be analyzed using the RCNN model and the image data to determine whether the UI element is present in the expanded region. If the control is not found within the expanded search region, process 600 may iteratively expand the search region as described above with reference to expansion logic 624 until a region limit is reached. In an aspect, the region limit may correspond to a screen limit (e.g., the search region cannot exceed the resolution of the screen on which the UI is displayed). If the region limit is reached and the UI element has not been found, process 600 may finish, as shown at blocks 620, 622, 626.

If the UI element is found by the localization logic 606 in the original or expanded search region, process 600 may proceed to target identification logic 608. Target identification logic 608 may be configured to identify a central point (CP) of the target control, which may be expressed as CPx, CPy. Once the central point is identified by target identification logic 608, process 600 may proceed to move to target logic 410. The move to target logic 610 may be configured to generate instructions for moving an action initiating element (e.g., a cursor of a mouse, etc.) to the UI element. In an aspect, the action initiating element may be moved to the location defined by CPx, CPy. It is noted that in some aspects the central point may correspond to a center of the target UI element, while in other aspects the central point may merely represent a location that is within the boundaries of the actionable area of the target UI element. Once the instructions are generated, the move to target logic 610 may execute the instructions to move the action initiating element to the central point.

While the instructions are being executed to move the action initiating element to the central point, process 600 may proceed to monitoring logic 612. Monitoring logic 612 may be configured to delay execution of an action (e.g., the action indicated in the input data 604) for a period of time. The period of time may correspond to an amount of time required to complete movement of the action initiating element to the central point, which may be less than 1 second, between 1 and 3 seconds, between 1 and 10 seconds, or some other time interval. In some aspects, the period of time in which execution of the action is delayed may also be utilized to verify pre-validation data included in the input data 604.

After the time period for delaying the action is complete, the process 600 may proceed to execution logic 614 and the action may be performed, such as a click or other type of action(s). As an illustrative example, if the action is associated with inputting text into a data field, the execution logic 614 may be configured to click the data field and write text (e.g., text from the input data 604) to the data field. Once the action is executed, process 600 may proceed to validation logic 616, which may be configured to determine whether the action was successfully executed based on the post-validation data. For example, the validation logic 616 may be configured to use OCR to extract data from the data field. If the text extracted by the OCR process matches the text specified for entry into the data field by the input data 604, the validation logic 616 may determine that the action was performed successfully and process 600 may be completed, as shown by blocks 620, 622, 626. In some aspects, additional validation techniques may also be utilized. For example, prior to executing the action, the UI element may be subjected to OCR analysis and text of the UI element may be extracted. The validation logic 616 may determine whether the text extracted during post-validation matches the text extracted prior to executing the action. If the post-validation text matches the earlier extracted text, the validation logic 616 may determine that the UI element is not editable or not in an actionable state, and process 600 may end. If the post-validation text matches the intended input text, validation logic 616 may determine that the UI element is actionable and may complete the action. As another example, a data field may have pre-input text that serves as a prompt, as in prompt 214 and data field 216 of FIG. 2A. Using the concepts described above, the pre-action execution text extracted via OCR may correspond to the prompt 214. Upon clicking on the data field 216 via the execution logic 614, the prompt 214 may disappear, which will cause the post-validation text obtained via OCR to be different, which may indicate the data field 216 is editable, and additional text may be input to the data field via execution logic 618.

It is noted that the process flow shown in FIG. 6 may be modified in several ways depending on the level of validation that may be performed and whether performance related issues may impact execution of actions. For example, in network-enabled UIs there may be an increased chance of delay with respect to activation of UI elements that may be actionable or non-actionable (e.g., due to network congestion, etc.). In such applications the process 600 may be modified to incorporate additional attempts, as described above with reference to FIG. 4. Furthermore, other non-OCR-based techniques may be utilized to detect whether UI elements are actionable, such as using the RCNN model to detect changes to the state of the UI in response to action execution (e.g., in the pre-validation phase the RCNN model may detect the presence of the prompt 214 in the data field 216 and during post-validation the RCNN model detect whether or not the prompt 214 has been removed in response to clicking on the data field 216). Additional modifications or changes may also be made, as will be apparent to one of ordinary skill in the art.

As shown above, the process 600 of FIG. 6 provides a technique for locating a UI element upon which an action is to be performed and provides pre-validation and/or post-validation techniques that may be used to detect whether the UI element is actionable. Furthermore, the process 600 provides capabilities to expand the search region for locating the UI element in the event it is not found in an expected position or region of the UI, thereby enabling the process 600 to automate UI interactions despite the presence of dynamic content or changes to the arrangement of elements within the UI. It is noted that an automated sequence of UI interactions may involve multiple executions of the process 600, each execution corresponding to a different UI interaction or element. Accordingly, it should be understood that FIG. 6 has been described with respect to executing a single action for purposes of illustration, but that additional actions may be performed in the same manner as described above.

As shown above with reference to FIGS. 1-6, the system 100 and more particularly, the automation engine 120 of the UIA device 110, provides a robust set of techniques for automating sequences of UI interactions. It should be understood that while the processes 300, 400, 500, 600 of FIGS. 3-6 have been described with reference to a single UI interaction, each of these processes may be performed during execution of a single automated sequence of UI interactions depending on the particular sequence of UI interactions and the UI elements present in the UI. Furthermore, it should be understood that while specific examples of using the processes 300, 400, 500, 600 have been described above with reference to FIGS. 3-6, those processes are not limited to the specific non-limiting examples discussed therein. For example, the process 300 of FIG. 3A for traversing a tree view may be readily utilized to traverse other types of UI elements in which UI elements may be expanded and collapsed, such as dropdown menus (e.g., a file menu, a view menu, etc. commonly found on many applications).

It should also be understood that the various processes 300, 400, 500, 600 may be used to automate more complex actions involving UIs and UI elements, such as drag-and-drop actions, which may be difficult or impossible to automate using prior techniques. To illustrate, in a typical drag-and-drop action there is a first target UI element (i.e., the UI element being dragged) and a second target UI element (i.e., the UI element upon which the first target UI element is dropped). Using the processes described herein, such as the process 400, a sequence of UI interactions involving a drag-and-drop action may be performed by first using the process 400 to locate the first and second target UI elements. Using the locations of the target elements determined by the process 400, an action may be executed to click-and-hold the cursor on the first target UI element and then move the cursor to the second target UI element, thereby performing an automated drag-and-drop action. Moreover, since process 400 provides capabilities to address dynamic content via expansion logic 432, the drag-and-drop action may be performed despite potential changes in the positions of the first target UI element, the second target UI element, or both, which would not be possible using prior techniques. Additionally, using the pre-validation and post-validation techniques described herein, validation that the drag-and-drop action was successfully performed may be determined automatically, such as by validating detection of the first and second target UI elements prior to executing the drag-and-drop action (i.e., pre-validation of the presence of the target UI elements) and verifying that the first target UI element is present in the container of the second UI element (e.g., when the second target UI element is a folder and the contents of the folder are visible within the UI) or that the first target UI element is no longer detectable at its prior location (or the entire visible UI), which may signify the first target UI element is now in the second target UI element (i.e., when the second target UI element is a folder icon and the contents of the folder are not visible).

In addition to enabling automation of new types of UI interactions and improving the reliability of such automated UI interactions through various techniques (e.g., pre- and post-validation, search space expansion to handle dynamic content, etc.), the system 100 of FIG. 1 may also enable other types of UI interactions to be automated, such as interactions involving drawings or other non-traditional UI elements for which automation of interactions is not possible using current techniques. For example and referring to FIG. 7, a screenshot illustrating exemplary UI automation functionality according to one or more aspects of the present disclosure is shown as a screenshot 700. In particular, the screenshot 700 shows a user interface for interacting with 3D drawings, such as drawings that may be produced using AutoCAD, Photoshop, and the like.

Figure 7:
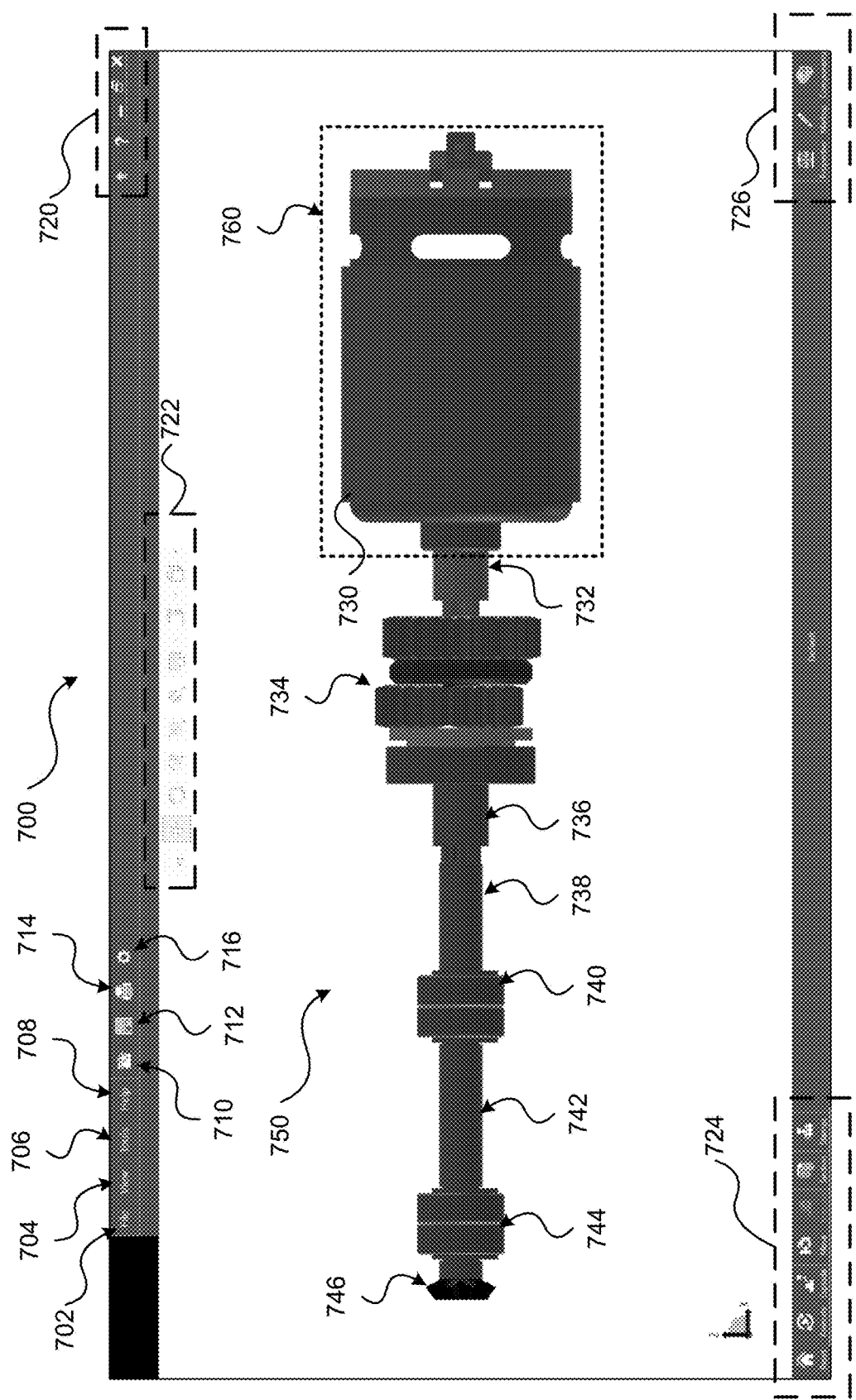
FIG. 7 is a screenshot illustrating additional exemplary UI automation functionality according to one or more aspects of the present disclosure.

As shown in FIG. 7, the screenshot 700 illustrates a UI that includes several UI elements common to many UIs, such as a "File" menu 702, "View" menu 704, "Tools" menu 706, "Help" menu 708, an "Open" icon 710, a "Save" icon 712, a "Print" icon 714, and a "Settings" icon 714. Additional UI elements common to many UIs are also shown in region 720, such as a "?" icon for accessing a help menu, a "_" icon that may be used to minimize the display of the UI, a restore icon (shown as two rectangular overlapping shapes), and an "X" icon for closing the UI. The UI shown in the screenshot 700 also includes regions 722, 724, and 726, each containing UI elements providing various types of functionality for interacting with and viewing a 3D drawing 750. Presently available UI interaction automation techniques may be capable of providing limited functionality for interacting with the UI elements 702-716 and the UI elements in region 720, but are not particularly well suited for automating interactions with the 3D drawing 750 directly, or the UI elements in regions 722, 724, 726 since those regions involve actions that manipulate the 3D drawing 750. However, as described in more detail below, using the concepts disclosed herein with reference to FIGS. 1-6, the automation engine 120 of the UIA device 110 of FIG. 1 may enable automated sequences of UI interactions involving the 3D drawing 750, as well as the UI elements in regions 722, 724, 726.

As shown in FIG. 7, the 3D drawing 750 shows a motor 730 having a driveshaft 732 in communication with a drivetrain that includes a plurality of gears 734, a drive interface 736, a drive extension 738 coupled to the drive interface 736, bearing assemblies 740, 744, a drive extension 742, and a drive gear 746. Each of these different components may be individually selectable, such as by clicking on one of the components. Once a component is clicked, other actions may be executed to modify the drawing 750, such as to hide components (e.g., the selected component or the non-selected components), to make a component transparent, or other actions and manipulations. Other manipulations of the 3D drawing 750 may be performed using the UI elements within the region 722, which may include UI elements to control rotation of the 3D drawing 750, UI elements to select pre-determined views of the 3D drawing 750 (e.g., front view, back view, side view (left side), side view (right side), top view, bottom view, perspective view, etc.), UI elements to pan the visible area of the 3D drawing 750, UI elements providing various zoom features (e.g., zoom to fit, zoom to area, etc.), or other view controls. The UI elements in region 724 may provide additional controls for manipulating aspects of the displayed 3D drawing 750, such as to animate the 3D drawing (e.g., animate to dynamically rotate and display the 3D drawing from various views, such as those mentioned above), a UI element to present an exploded view of the 3D drawing 750, a UI element to show a cross-section of the 3D drawing, and the like. The UI elements in region 726 may provide other types of functionality, such as to modify properties of the components of the 3D drawing, to markup the 3D drawing, or to display a tree view of the components included in the 3D drawing.

As can be appreciated from the foregoing, the UI elements in the regions 722, 724, 726, as well as the components of the 3D drawing 750 themselves, are not the types of UI elements that existing UI automation techniques, which are primarily OCR based or rely on static positions of UI elements, are designed for. However, using the automation engine 120 of FIG. 1, sequences of automated UI interactions may be recorded and replayed in an automated fashion. For example, suppose that the user clicks on the motor 730. As described above, during recording of the sequence of UI interactions, the automation engine 120 may detect, during a hovering period, the location of the cursor and utilize the RCNN model to capture image data of the element the cursor is hovering over. In this example, the RCNN model may determine the region for capturing the image data as shown by box 760, and that image data may be stored in connection with a click action (e.g., when the user clicks on the motor 730). It is noted that additional types of information may be captured in connection with this action, such as location data, action type data, and the like. As described above with reference to FIG. 4, during execution of an automated sequence of UI interactions involving the contents of the UI shown in the screenshot 700, the localization logic 406 of FIG. 4 may receive input data that includes the image associated with box 760 and the location data. Using these inputs and the RCNN model, the localization logic 406 may to determine whether the motor is visible within the region corresponding to the location data. If the motor 730 is not found, the expansion logic 432 may be used to expand the search area in which the RCNN model attempts to locate the motor 730 based on the input image data captured during the hovering period. When the motor is found by the RCNN model, target identification logic 408 may identify a central point of the motor 730 and the move to target logic 410 may move the cursor to the central point of the motor 730. A monitoring period may be observed and after the monitoring period, the action (e.g., a click action) may be performed to click on the motor 730, thereby selecting an element of the 3D drawing.

The above-described capabilities provided by embodiments of the present disclosure may enable new types of automated sequences of UI interactions that were not possible using prior techniques. Moreover, the ability to perform automated UI interactions with drawings is not limited to mere selection of components in a 3D drawing. For example, using the RCNN model and automation techniques described herein may enable automation of tasks for creating 3D drawings, rotating 3D drawings, moving 3D drawings (e.g., including movement of the 3D drawing using the pan feature or via a drag-and-drop type movement), or other types of interactions with drawings (including 2D drawings). It is noted that the various exemplary UI interactions that may be achieved using the automation engine 120 and the processes 300, 400, 500, 600 disclosed herein have been provided for purposes of illustration, rather than by way of limitation and that other types of UI automations may also be realized using the techniques of the present disclosure. Furthermore, it should be understood that aspects of the processes 300, 400, 500, 600 have been describe individually, portions of those processes may be incorporated into other ones of those processes to address particular issues that may arise when attempting to automate sequences of UI interactions, such as incorporating monitoring logic and validation logic into processes at various points when performance related issues may impact execution of interactions with UI elements.

Figure 8:
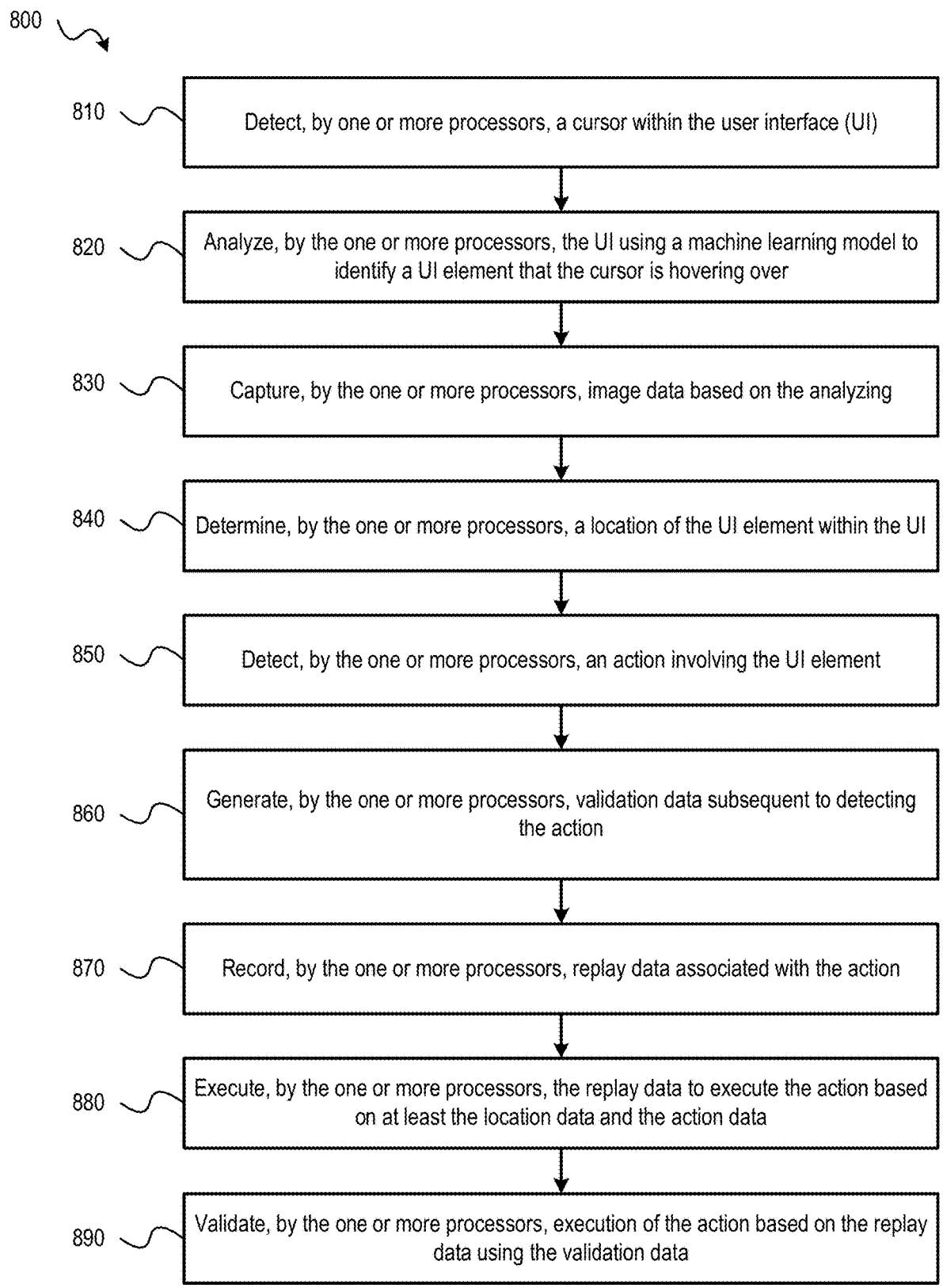
FIG. 8 is a flow diagram illustrating an exemplary method for UI automation according to one or more aspects of the present disclosure.

Referring to FIG. 8 is a flow diagram illustrating an exemplary method for UI automation according to one or more aspects of the present disclosure is shown as a method 800. In some aspects, the method 800 may be stored as instructions (e.g., the instructions 116 of FIG. 1) that, when executed by one or more processors (e.g., the one or more processors 112 of FIG. 1 or one or more processors of cloud-based UIA device 132 of FIG. 1), cause the one or more processors to perform operations for UI automation in accordance with aspects of the present disclosure. It is noted that the method 800 may be performed by an automation engine, such as the automation engine 120 of FIG. 1. Furthermore, it is noted that an automation engine implementing the method 800 may be executed on a variety of different devices, such as the UIA devices 110, 132 of FIG. 1, a user device (e.g., the user device 140 of FIG. 1), or other types of computing devices.

At step 810, the method 800 includes detecting, by one or more processors, a cursor within the UI. In some aspects, the cursor may be detected during a hovering period, where the user places the cursor over a UI element for a hover period and then performs an action, as described above with reference to FIG. 1. At step 820, the method 800 includes analyzing, by the one or more processors, the UI using a machine learning model to identify a UI element that the cursor is hovering over. The machine learning model may be configured to provide computer vision capabilities, such as to recognize UI elements (e.g., the UI element the cursor is hovering over). For example, the machine learning model may be the RCNN model described above with reference to FIG. 1. At step 830, the method 800 includes capturing, by the one or more processors, image data based on the analyzing. The image data may include information depicting the UI element identified by the machine learning model. At step 840, the method 800 includes determining, by the one or more processors, a location of the UI element within the UI. The location information may indicate an expected location for the UI element, which may be utilized during subsequent execution of an automated sequence of UI interactions, as described elsewhere herein. The method also 800 includes, at step 850, detecting, by the one or more processors, an action involving the UI element and at step 860, generating, by the one or more processors, validation data subsequent to detecting the action.

At step 870, the method 800 includes recording, by the one or more processors, replay data associated with the action. The replay data may include location data corresponding to the expected location of the UI element, action data representative of the detected action, and the validation data. The replay data may also include other types of data, as described herein, as well as information associated with other types of actions to be executed as part of an automated sequence of UI interactions. At step 880, the method 800 includes executing, by the one or more processors, the replay data to execute the detected action based on at least the location data and the action data. In an aspect, the replay data may be executed using one or more of the processes described with reference to FIGS. 3-7 and may utilize the methods described with reference to FIGS. 9-11. At step 890, the method 800 includes validating, by the one or more processors, execution of the detection action based on the replay data using the validation data. It is noted that the validation at step 890 may be performed using any of the validation techniques disclosed herein, as well as others that may be readily apparent to one of ordinary skill in the art in accordance with the concepts disclosed herein.

It is noted that portions of the method 800 (e.g., steps 810-870) may be performed multiple times as part of a process for generating a sequence of automated UI interactions while other portions of the method 800 (e.g., steps 880-890) may be performed multiple times to automatically execute multiple actions present in the replay data. It is noted that the method 800 may include additional functionality for capturing information used to generate the replay data, as well as to execute the sequence of automated actions, as described with reference to FIGS. 1-7 and 9-11. Accordingly, it is to be understood that the method 800 may be combined with any of the methods of FIGS. 9, 10, 11 and the functionality described with reference to FIGS. 1-7 to facilitate generation and execution of sequences of UI interactions on a variety of different types of UI elements (e.g., controls, data fields, tree views, data grids, dynamic content, and the like.

Figure 9:
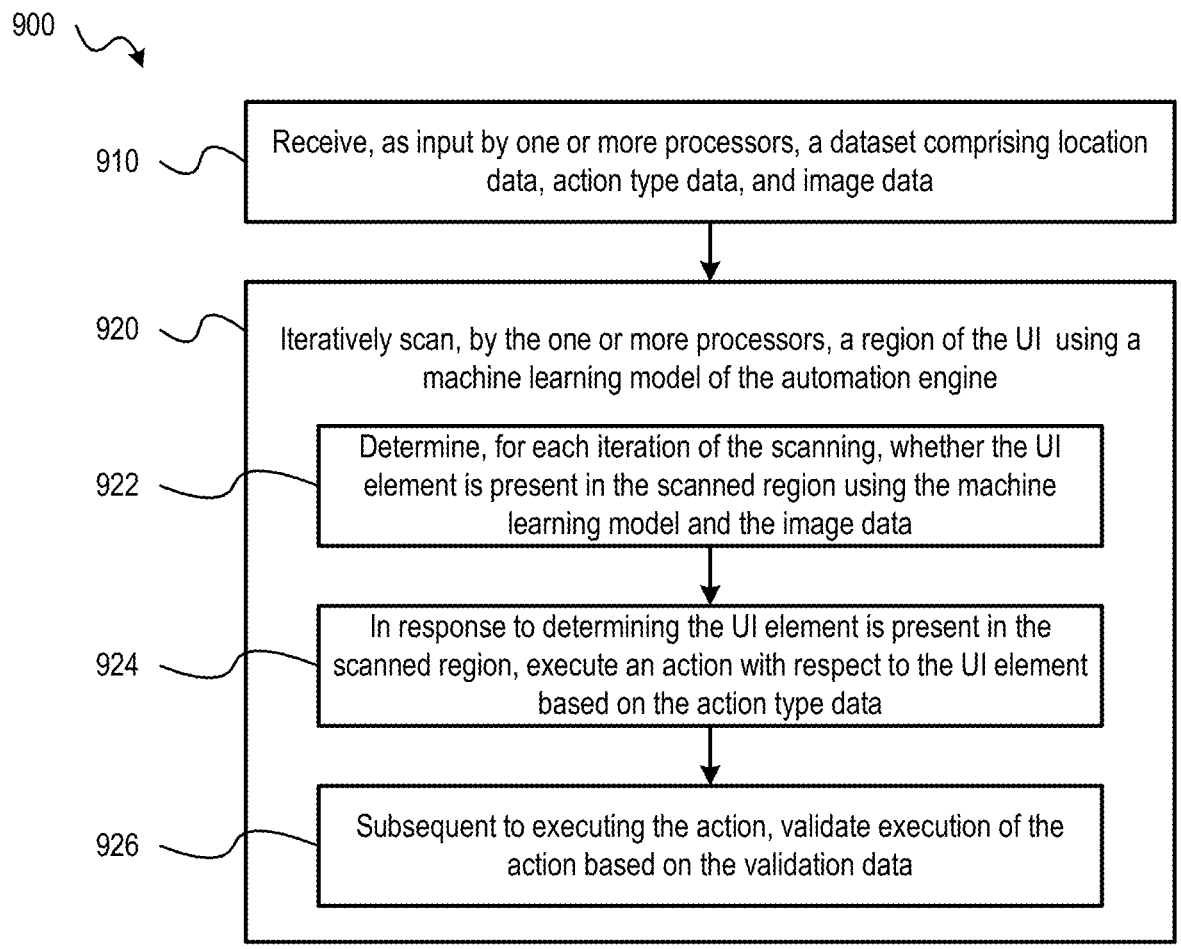
FIG. 9 is a flow diagram illustrating another exemplary method for UI automation according to one or more aspects of the present disclosure.

Referring to FIG. 9 is a flow diagram illustrating another exemplary method for automation of UI tasks according to one or more aspects of the present disclosure is shown as a method 900. In some aspects, the method 900 may be stored as instructions (e.g., the instructions 116 of FIG. 1) that, when executed by one or more processors (e.g., the one or more processors 112 of FIG. 1 or one or more processors of cloud-based UIA device 132 of FIG. 1), cause the one or more processors to perform operations for UI automation in accordance with aspects of the present disclosure. It is noted that the method 900 may be performed by an automation engine, such as the automation engine 120 of FIG. 1. Furthermore, it is noted that an automation engine implementing the method 900 may be executed on a variety of different devices, such as the UIA devices 110, 132 of FIG. 1, a user device (e.g., the user device 140 of FIG. 1), or other types of computing devices.

At step 910, the method 900 includes receiving, as input, a dataset comprising location data, action type data, and image data. The location data may identify an expected location of a UI element, such as a location determined during capturing of a sequence of UI interactions using the techniques described herein. The action type data may include information that identifies a type of action to be executed with respect to the UI element, such as a click (e.g., left click, right click, click-and-hold, etc.), and the image data may include information identifying the UI element (e.g., an image of a UI element captured using the RCNN model as described above). It is noted that the input data received at step 910 may include other types of data, such as the data described above with reference to FIG. 4.

At step 920, the method 900 includes iteratively scanning, using a machine learning model of the automation engine, a region of the UI. As described above with reference to FIGS. 1 and 4, the machine learning model may be a RCNN model. At step 922, the method 900 includes determining, for each iteration of the scanning, whether the UI element is present in the scanned region using the machine learning model and the image data. It is noted that the scanned region may be initialized to a region of the UI corresponding to the location data during a first iteration, and that the scanned region may be subsequently expanded during each subsequent iteration (e.g., until the UI element is located or a scan limit is reached), as described above with reference to FIG. 4. At step 924, the method 900 includes executing an action with respect to the UI element based on the action type data in response to determining the UI element is present in the scanned region. In some aspects, the method 900 may also include, at step 926, validating execution of the action based on the validation data subsequent to executing the action. It is noted that the validation execution of the action may include pre-validation, post-validation, or both depending on the type of action being performed and the UI element upon which the action is executed. For example, where the action is a write action to input data into a data field, validation may be performed as described above with reference to FIG. 6. For other types of UI elements other forms of validation may be utilized in accordance with the concepts disclosed herein.

It is noted that the method 900 may include additional functionality for locating UI elements and executing actions, such as the functionality described above with reference to FIG. 4. For example, the method 900 may provide functionality for generating instructions for moving a cursor to the UI element once it is located, effectuating a monitoring period prior to executing the action, or other types of functionality. Moreover, it is noted that the method 900 may be performed as part of a sequence of automated UI interactions and that other UI interactions may involve functionality and processes described with reference to the method 800 of FIG. 8, the method 1000 of FIG. 10, the method 1100 of FIG. 11, or the functionality described with reference to FIGS. 1-7. Accordingly, it is to be understood that the method 900 may be combined with any of the methods of FIGS. 8, 10, 11 and that the methods disclosed herein may be used in any order depending on the particular types of UI elements for which automated execution is desired.

Figure 10:
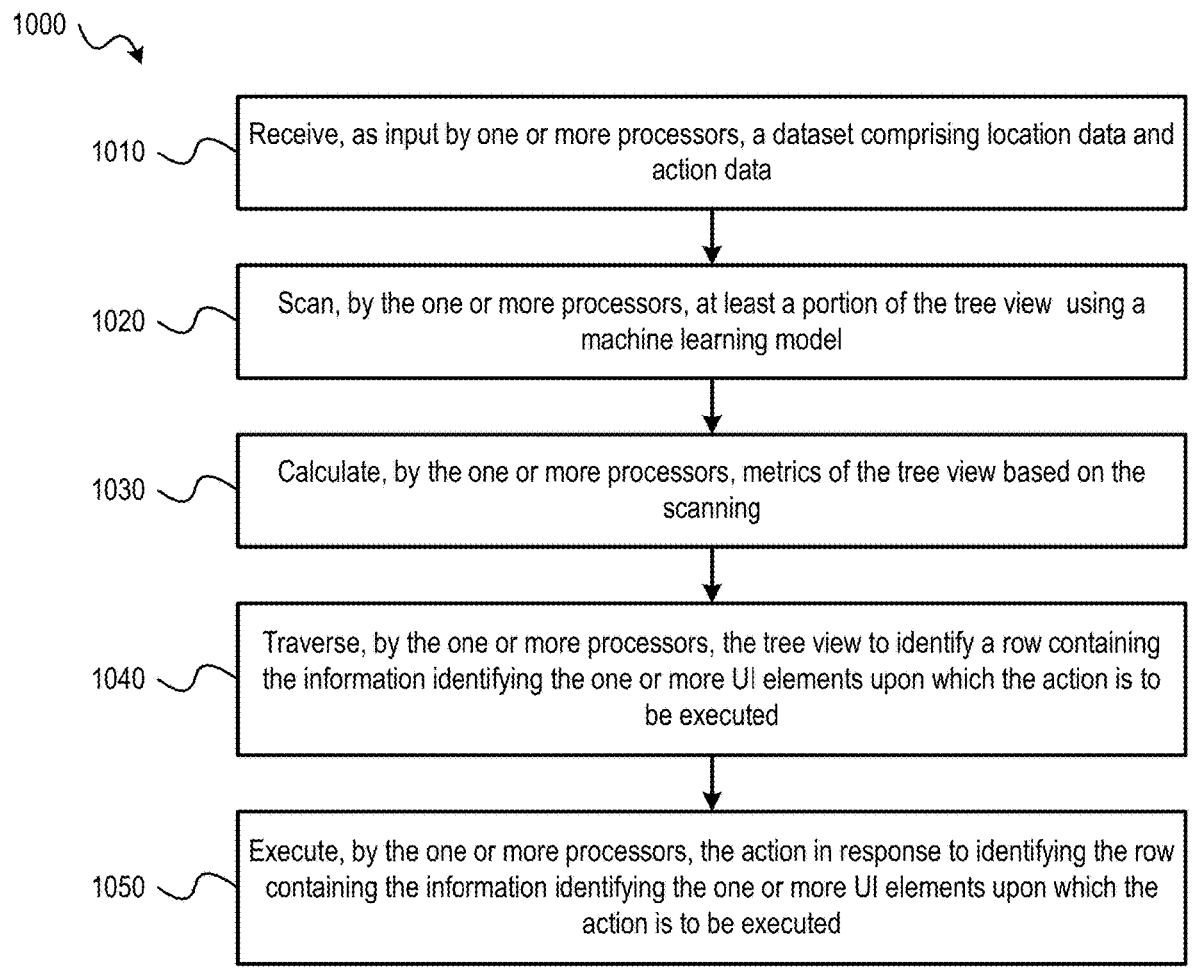
FIG. 10 is a flow diagram illustrating an exemplary method for UI automation according to one or more aspects of the present disclosure.

Referring to FIG. 10 is a flow diagram illustrating another exemplary method for automation of UI tasks according to one or more aspects of the present disclosure is shown as a method 1000. In some aspects, the method 1000 may be stored as instructions (e.g., the instructions 116 of FIG. 1) that, when executed by one or more processors (e.g., the one or more processors 112 of FIG. 1 or one or more processors of cloud-based UIA device 132 of FIG. 1), cause the one or more processors to perform operations for UI automation in accordance with aspects of the present disclosure. It is noted that the method 1000 may be performed by an automation engine, such as the automation engine 120 of FIG. 1. Furthermore, it is noted that an automation engine implementing the method 1000 may be executed on a variety of different devices, such as the UIA devices 110, 132 of FIG. 1, a user device (e.g., the user device 140 of FIG. 1), or other types of computing devices.

At step 1010, the method 1000 includes receiving, as input, a dataset comprising location data and action data. As described above with reference to FIG. 3A, the location data may correspond to a location of a tree view comprising a plurality of UI elements (e.g., the levels or rows of the tree view, as well as the action indicators, icons, and targets). The action data may include information that identifies an action and information identifying one or more UI elements upon which the action is to be executed (e.g., an icon, a target UI element, etc.). As illustrated with reference to FIG. 2B, the tree view may include at least one expandable row, and expansion of the at least one expandable row displays child rows. It is noted that the input data received at step 1010 may include other types of data, such as the data described above with reference to FIG. 2. At step 1020, the method 1000 scanning, using a machine learning model, at least a portion of the tree view. In an aspect, the machine learning model may be the RCNN model described above. In additional or alternative aspects, the machine learning model may be replaced with OCR logic (e.g., for text based identification processes). In still additional or alternative aspects, both the machine learning model and OCR techniques may be utilized.

At step 1030, the method 1000 calculating metrics of the tree view based on the scanning. In an aspect, the metrics calculated at step 1030 may include one or more of the various metrics described above with reference to FIG. 3A. At step 1040, the method 1000 traversing the tree view to identify a row containing the information identifying the one or more UI elements upon which the action is to be executed. In an aspect, the tree view may be traversed as described above with reference to FIG. 2. At step 1050, the method 1000 executing the action in response to identifying the row containing the information identifying the one or more UI elements upon which the action is to be executed.

It is noted that the method 1000 may include additional functionality for traversing and analyzing tree view UI elements, such as the various functionality described above with reference to FIG. 2. For example, the method 1000 may provide functionality for generating mapping data as the tree view is traversed and functionality for scrolling the tree view, where the mapping data may be used to configure a waypoint from which tree view traversal may resume after the scrolling. Moreover, it is noted that the method 1000 may be performed as part of a sequence of automated UI interactions and that other UI interactions may involve functionality and processes described with reference to the method 800 of FIG. 8, the method 900 of FIG. 9, the method 1100 of FIG. 11, or the functionality described with reference to FIGS. 1-7. Accordingly, it is to be understood that the method 1000 may be combined with any of the methods of FIGS. 8, 9, 11 and that the methods disclosed herein may be used in any order depending on the particular types of UI elements for which automated execution is desired.

Figure 11:
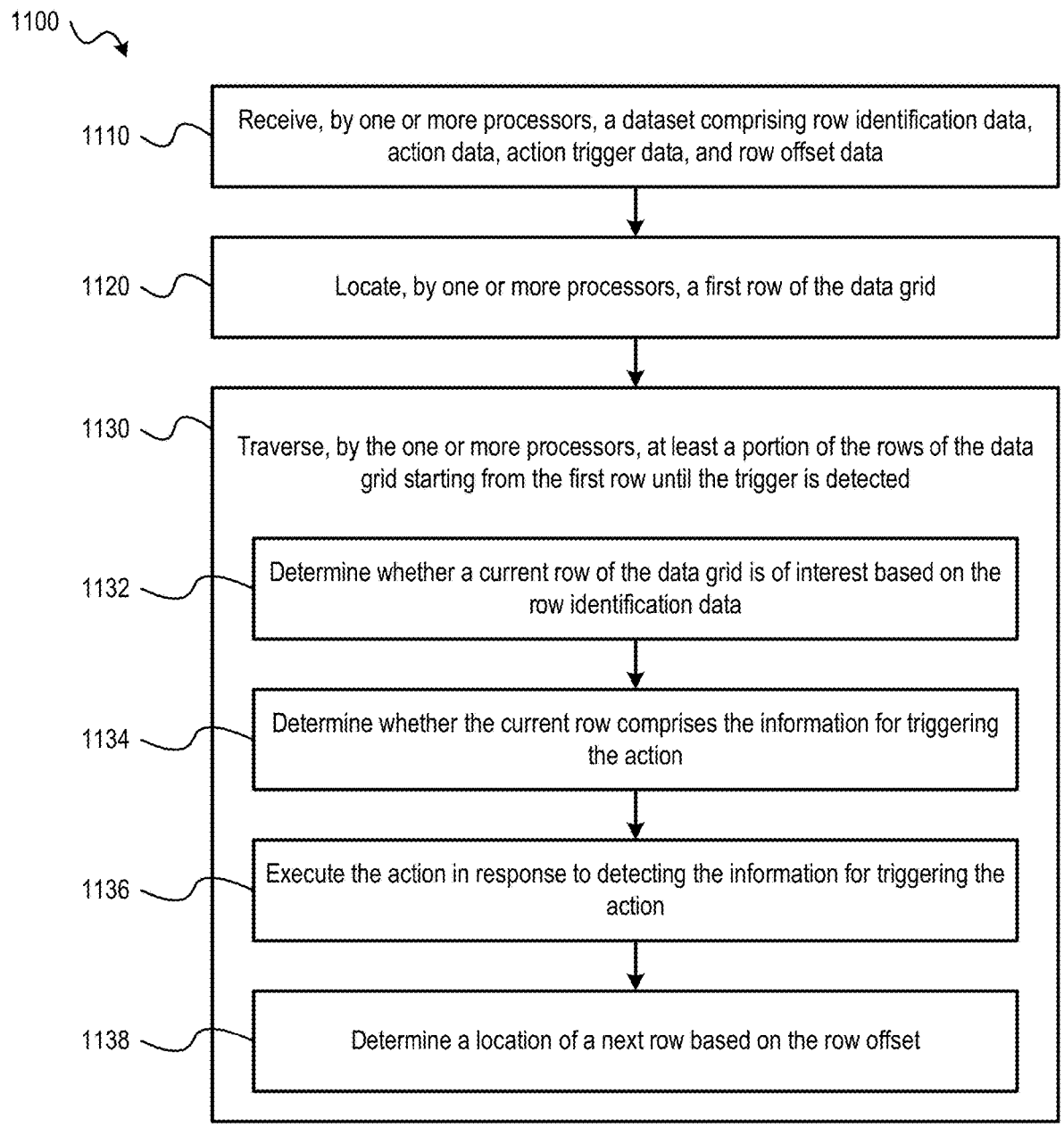
FIG. 11 is a flow diagram illustrating an exemplary method for UI automation according to one or more aspects of the present disclosure.

Referring to FIG. 11 is a flow diagram illustrating another exemplary method for automation of UI tasks according to one or more aspects of the present disclosure is shown as a method 1100. In some aspects, the method 1100 may be stored as instructions (e.g., the instructions 116 of FIG. 1) that, when executed by one or more processors (e.g., the one or more processors 112 of FIG. 1 or one or more processors of cloud-based UIA device 132 of FIG. 1), cause the one or more processors to perform operations for UI automation in accordance with aspects of the present disclosure. It is noted that the method 1100 may be performed by an automation engine, such as the automation engine 120 of FIG. 1. Furthermore, it is noted that an automation engine implementing the method 1100 may be executed on a variety of different devices, such as the UIA devices 110, 132 of FIG. 1, a user device (e.g., the user device 140 of FIG. 1), or other types of computing devices.

At step 1110, the method 1100 includes receiving, by one or more processors, a dataset comprising row identification data, action data, action trigger data, and row offset data, wherein the row identification data comprises information for identifying one or more rows of interest within a data grid, and wherein the action data comprises information that indicates an action to be performed with respect to the one or more rows of interest within the data grid, wherein the action trigger data comprises a trigger for executing the action, and wherein the row offset data comprises information that indicates a location of a next row within the data grid relative to a current row of the data grid. It is noted that the input data received at step 1110 may include other types of data, such as the data described above with reference to FIG. 5.

At step 1120, the method 1100 includes locating a first row of the data grid. In an aspect, the first row of the data grid may be located as described above with reference to FIG. 5. At step 1130, the method 1100 includes traversing, by the one or more processors, at least a portion of the rows of the data grid starting from the first row until the trigger is detected. As explained above with reference to FIG. 5, during traversal of the rows of the data grid each row may be analyzed. In an aspect, the analysis performed on each row in accordance with the method 1100 may include, at step 1132, determining whether a current row of the data grid is of interest based on the row identification data. In an aspect, determining whether the current row of the data grid is of interest may be performed as described above with reference to FIG. 5. In an aspect, the analysis performed on each row in accordance with the method 1100 may include, at step 1134, determining whether the current row includes the information for triggering the action. In an aspect, the determination of whether the current row includes the information for triggering the action may be performed as described above with reference to FIG. 5. In an aspect, the analysis performed on each row in accordance with the method 1100 may include, at step 1136, executing the action in response to detecting the information for triggering the action. As described above with reference to FIG. 5, the action may include outputting the rows of interest (e.g., rows containing particular information, all rows, etc.) or other types of actions, such as outputting data extracted from rows the data grid, writing data to the data grid, reading data from the data grid, activating an icon in the data grid, clicking on a row or field of the data grid, accessing a next column of the data grid, and the like. At step 1138, the method 1100 includes determining a next row based on the row offset. The next row is set to the current row during a next iteration of the traversing.

It is noted that the method 1100 may include additional operations and functionality as described in detail above. For example, the method 1100 may be configured to generate mapping data as the data grid is traversed. The mapping data may be used to generate the output data when the information for triggering the action is detected. The mapping data may also be used to support scrolling of the data grid, where the mapping data may be used to configure a waypoint from which traversing the data grid may resume after the scrolling. Other types of operations and analysis may also be performed, including any of the functionality and operations described with reference to FIGS. 1-10. Moreover, it is noted that the method 1100 may be performed as part of a sequence of automated UI interactions and that other UI interactions may involve functionality and processes described with reference to the method 800 of FIG. 8, the method 900 of FIG. 9, the method 1000 of FIG. 10, or the functionality described with reference to FIGS. 1-7. Accordingly, it is to be understood that the method 1100 may be combined with any of the methods of FIGS. 8-10 and that the methods disclosed herein may be used in any order depending on the particular types of UI elements for which automated execution is desired.

It is noted that the exemplary automation techniques described above with reference to FIGS. 1-11 provide new techniques for enabling automation of UI interactions. Moreover, by enabling various validations to be performed on automated sequences of UI interactions, the disclosed automation techniques may be particularly well suited for certain types of use cases where automation of UI interactions may be utilized, such as testing data entry and other types of UI-based applications, UIs involving dynamic content, Us including tree views, UIs including data grids, and the like. Furthermore, by utilizing the RCNN model other types of UI interaction may now be automated, such as UI interactions involving drawing elements, as described with reference to FIG. 7, which prior UI automation techniques are not capable of being automated or for which automation may be difficult using prior techniques. Additionally, the techniques disclosed herein may be readily applied to other types of UI elements and interaction sequences, such as dropdown menus, UIs having multiple tabs or sheets, capturing all or portions of a data grid, automation of legacy tools and applications, and the like. Furthermore, the automation techniques disclosed herein may be used to automate UI interactions for systems where automation software cannot be installed on the target devices and for touchscreen displays (e.g., a camera may be used to capture information associated with interactions with the UI via the touchscreen or target device and to detect state information for the UI during replay of those actions, such as using a robotic arm with a stylus to interact with specific regions of a touchscreen or by providing the target device with commands simulating mouse movements or touchscreen interactions).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-11) include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method for user interface (UI) automation, the method comprising:
   detecting, by one or more processors, a cursor within the UI;
   analyzing, by the one or more processors, the UI using a machine learning model to identify a UI element that the cursor is hovering over, wherein the machine learning model is configured to provide computer vision capabilities;
   capturing, by the one or more processors, image data based on the analyzing, wherein the image data comprises information depicting the UI element identified by the machine learning model;
   determining, by the one or more processors, a location of the UI element within the UI;
   detecting, by the one or more processors, an action involving the UI element;
   generating, by the one or more processors, validation data subsequent to detecting the action;
   recording, by the one or more processors, replay data associated with the action, wherein the replay data comprises location data corresponding to the location of the UI element, action data representative of the action detected as involving the UI element, and the validation data;
   executing, by the one or more processors, the replay data to execute the action based on at least the location data and the action data; and
   validating, by the one or more processors, execution of the action based on the replay data using the validation data.

2. The method of claim 1, wherein the machine learning model is a region-based convolutional neural network (RCNN) model.

3. The method of claim 2, wherein the UI element comprises a component of a 3-dimensional (3D) drawing, and wherein executing the replay data comprises:
   detecting the component of the 3D drawing based on the image data using the RCNN model, wherein the action comprises at least selecting the component of the 3D drawing automatically.

4. The method of claim 1, wherein the validating comprises performing pre-validation prior to executing the action, post-validation subsequent to executing the action, or both.

5. The method of claim 1, further comprising incorporating the image data into the machine learning model, where the UI element is subsequently identified based at least in part on the image data incorporated into the machine learning model.

6. A system for user interface (UI) automation, the system comprising:
   a memory;
   one or more processors communicatively coupled to the memory; and
   an automation engine executable by the one or more processors, wherein the automation engine comprises a machine learning model, and wherein the automation engine is configured to:
      receive, as input, a dataset comprising location data, action type data, and image data, wherein the location data corresponds to an expected location of a UI element, wherein the action type data comprising information that identifies a type of action to be executed with respect to the UI element, and wherein the image data comprises information identifying the UI element; and
      iteratively scan, using a machine learning model of the automation engine, a region of the UI, wherein the scanned region is initialized to a region of the UI corresponding to the location data during a first iteration, and wherein the scanned region is expanded during each subsequent iteration;
      determine, for each iteration of the scanning, whether the UI element is present in the scanned region using the machine learning model and the image data; and
      in response to determining the UI element is present in the scanned region, execute an action with respect to the UI element based on the action type data.

7. The system of claim 6, wherein the scanned region is expanded by a pre-determined amount during each iteration.

8. The system of claim 6, wherein the dataset comprises validation data for verifying execution of the action, and wherein the automation engine is configured to validate execution of the action based on the validation data subsequent to executing the action.

9. The system of claim 8, wherein the automation engine is configured to:
   initialize a retry counter in response to the validation indicating that the action was not completed;
   reperform the validation after a period of time; and
   increment retry counter after the reperforming the validation,
   wherein the initializing, the reperforming, and the incrementing are performed repeatedly until the retry counter satisfying a retry limit, and wherein the action is executed upon the retry counter satisfying the retry limit.

10. The system of claim 6, wherein the automation engine is configured to postpone execution of the action for an amount of time subsequent to determining the UI element is present in the scanned region.

11. The system of claim 6, wherein the automation engine is configured to determine whether the UI element is actionable prior to and/or subsequent to executing the action.

12. A non-transitory computer-readable storage medium storing instructions that, when executed by one or more processors, cause the one or more processors to perform operations for user interface (UI) automation, the operations comprising:
   receiving, as input, a dataset comprising location data and action data, wherein the location data corresponds to a location of a tree view comprising a plurality of UI elements, wherein the action data comprises information identifying an action and information identifying one or more UI elements upon which the action is to be executed, and wherein the tree view comprises at least one expandable row, wherein expansion of the at least one expandable row displays child rows;
   scanning, using a machine learning model, at least a portion of the tree view;
   calculating metrics of the tree view based on the scanning;
   traversing the tree view to identify a row containing the information identifying the one or more UI elements of the plurality of UI elements upon which the action is to be executed; and
   executing the action in response to identifying the row containing the information identifying the one or more UI elements upon which the action is to be executed.

13. The non-transitory computer-readable storage medium of claim 12, the operations comprising generating mapping data during the traversing, the mapping data comprising information associated with each row of the tree view that has been traversed.

14. The non-transitory computer-readable storage medium of claim 13, the operations comprising:
configuring a waypoint based on the mapping data;
executing a scrolling action to scroll the tree view, wherein the scrolling action is distinct from the action identified in the dataset; and
resuming traversing of the tree view subsequent to the scrolling action based on the waypoint.

15. The non-transitory computer-readable storage medium of claim 12, the operations comprising expanding a level of the tree view during the traversing, wherein the expanding exposes one or more child rows of the expanded level of the tree view, and wherein the traversing includes traversing the one or more child rows.

16. The non-transitory computer-readable storage medium of claim 15, wherein the at least one level of the tree view is expanded via execution of an expand action, the expand action executed via clicking on an expansion icon displayed on a row corresponding to the expanded level.

17. A method for user interface (UI) automation, the method comprising:
receiving, by one or more processors, a dataset comprising row identification data, action data, action trigger data, and row offset data, wherein the row identification data comprises information for identifying one or more rows of interest within a data grid, and wherein the action data comprises information that indicates an action to be performed with respect to the one or more rows of interest within the data grid, wherein the action trigger data comprises a trigger for executing the action, and wherein the row offset data comprises information that indicates a location of a next row within the data grid relative to a current row of the data grid;
locating a first row of the data grid;
traversing, by the one or more processors, at least a portion of the rows of the data grid starting from the first row until the trigger is detected, wherein, for each row of at least the portion of the rows, the traversing comprises:
determining whether a current row of the data grid is of interest based on the row identification data;
determining whether the current row comprises the information for triggering the action;
executing the action in response to detecting the information for triggering the action; and
determining a next row based on the row offset, wherein the next row is set to the current row during a next iteration of the traversing.

18. The method of claim 17, wherein the action comprises a write action configured to insert information into the data grid, the method comprising:
determining whether a portion of the data grid into which the information is to be inserted by the write action is editable prior to and/or subsequent to executing the action.

19. The method of claim 17, further comprising generating mapping data during the traversing, the mapping data comprising information associated with each row of the data grid that has been traversed.

20. The method of claim 19, further comprising:
configuring a waypoint based on the mapping data;
executing a scrolling action to scroll the data grid, wherein the scrolling action is distinct from the action identified in the dataset; and
resuming traversing of the data grid subsequent to the scrolling action based on the waypoint.

* * * * *

UNITED STATES PATENT AND TRADEMARK OFFICE
CERTIFICATE OF CORRECTION

PATENT NO. : 11,803,396 B2  
APPLICATION NO. : 17/566992  
DATED : October 31, 2023  
INVENTOR(S) : Rajpreet Singh et al.

Page 1 of 1

It is certified that error appears in the above-identified patent and that said Letters Patent is hereby corrected as shown below:

In the Specification

At Column 1, Line number 58, delete "changes in)(Path" and replace with --changes in XPath--.
At Column 37, Line number 37, delete "Us including tree views" and replace with --UIs including tree views--.

In the Claims

At Column 43, Claim number 16, Line number 22, delete "wherein the at least" and replace with --wherein at least--.

Signed and Sealed this  
Twenty-eighth Day of November, 2023

Katherine Kelly Vidal  
*Director of the United States Patent and Trademark Office*